US012319835B2

(12) United States Patent
Mayo et al.

(10) Patent No.: US 12,319,835 B2
(45) Date of Patent: Jun. 3, 2025

(54) COATING COMPOSITIONS HAVING IMPROVED CORROSION RESISTANCE

(71) Applicant: PPG Industries Ohio, Inc., Cleveland, OH (US)

(72) Inventors: Michael A. Mayo, Pittsburgh, PA (US); Nicole L Rakers, Wexford, PA (US); Elizabeth A. Furar, Pittsburgh, PA (US); John R. Schneider, Allison Park, PA (US); Venkateshwarlu Kalsani, Gibsonia, PA (US); Troy J. Larimer, North Huntingdon, PA (US); Kamlesh J. Sheth, Monroeville, PA (US); James E McCarthy, Pittsburgh, PA (US); Victor F. Georgic, Pittsburgh, PA (US); Mary Lyn Chong Lim, Allison Park, PA (US); Arif Mubarok, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 110 days.

(21) Appl. No.: 16/956,439

(22) PCT Filed: Dec. 20, 2018

(86) PCT No.: PCT/US2018/066843
§ 371 (c)(1),
(2) Date: Jun. 19, 2020

(87) PCT Pub. No.: WO2019/126527
PCT Pub. Date: Jun. 27, 2019

(65) Prior Publication Data
US 2021/0363358 A1 Nov. 25, 2021

Related U.S. Application Data

(60) Provisional application No. 62/608,062, filed on Dec. 20, 2017.

(51) Int. Cl.
C09D 5/10 (2006.01)
C08K 3/08 (2006.01)
C08K 3/22 (2006.01)
C08K 5/00 (2006.01)
C09D 5/03 (2006.01)
C09D 5/08 (2006.01)
C09D 7/61 (2018.01)
C09D 163/00 (2006.01)

(52) U.S. Cl.
CPC ............... *C09D 5/103* (2013.01); *C08K 3/08* (2013.01); *C08K 3/22* (2013.01); *C08K 5/0025* (2013.01); *C09D 5/038* (2013.01); *C09D 5/084* (2013.01); *C09D 5/106* (2013.01); *C09D 7/61* (2018.01); *C09D 163/00* (2013.01); *C08K 2003/0812* (2013.01); *C08K 2003/0893* (2013.01); *C08K 2003/222* (2013.01); *C08K 2201/019* (2013.01)

(58) Field of Classification Search
CPC .............. C09D 163/00–10; C09D 7/61; C09D 5/08–084; C09D 5/103; C09D 5/106; C08K 2003/2217; C08K 2003/222; C08K 2003/2296; C08K 2003/0812; C08K 3/08; C08L 63/00–10
See application file for complete search history.

(56) References Cited

U.S. PATENT DOCUMENTS

| 3,464,854 | A | * | 9/1969 | Bolger | C09D 163/00 521/122 |
|---|---|---|---|---|---|
| 4,352,899 | A | | 10/1982 | Tada et al. | |
| 5,080,733 | A | * | 1/1992 | Deresh | C23C 22/27 148/266 |
| 5,135,992 | A | * | 8/1992 | Chang | C08G 69/42 525/487 |
| 2009/0324983 | A1 | * | 12/2009 | Hackbarth | C23C 22/83 524/441 |
| 2014/0302241 | A1 | * | 10/2014 | Lin | C08G 16/0268 427/393 |
| 2015/0247052 | A1 | * | 9/2015 | Yamashita | C08K 5/098 428/471 |
| 2015/0322271 | A1 | * | 11/2015 | Labouche | C09D 7/40 523/457 |

(Continued)

FOREIGN PATENT DOCUMENTS

| CA | 2674308 | A1 | * | 7/2008 | ......... C08G 18/4063 |
|---|---|---|---|---|---|
| CN | 1259553 | A | * | 7/2000 | |

(Continued)

OTHER PUBLICATIONS

Yaws' Critical Property Data for Chemical Engineers and Chemists (2013).*

(Continued)

Primary Examiner — Kregg T Brooks
(74) Attorney, Agent, or Firm — Krisanne Shideler

(57) ABSTRACT

The present invention is directed towards curable film-forming coating compositions comprising metal particles; an alkaline earth metal compound comprising an alkaline earth metal oxide, an alkaline earth metal carbonate, an alkaline earth metal hydroxide, an alkaline earth metal sulfate, an alkaline earth metal monocarboxylate, an alkaline earth metal phosphate, or combinations thereof; and an organic film-forming binder. Also disclosed are methods of making curable film-forming coating compositions, methods of coating substrates, and coated substrates resulting therefrom.

5 Claims, No Drawings

(56) References Cited

U.S. PATENT DOCUMENTS

2017/0066927 A1    3/2017  Breon et al.
2017/0096564 A1*   4/2017  Seeger ................... C09D 5/12

FOREIGN PATENT DOCUMENTS

| | | | | |
|---|---|---|---|---|
| CN | 1330693 | | 1/2002 | |
| CN | 102504674 | | 6/2012 | |
| CN | 104356875 A | * | 2/2015 | ........... C09D 163/00 |
| CN | 104540910 A | | 4/2015 | |
| DE | 3412234 C2 | * | 10/1988 | |
| EP | 2881443 A1 | | 6/2015 | |
| EP | 1236775 A1 | | 9/2020 | |
| GB | 2103218 A | | 2/1983 | |
| JP | 56088470 A | * | 7/1981 | |
| JP | S6050176 A | * | 8/1983 | |
| JP | H06-306629 A | * | 11/1994 | |
| JP | 2004059721 A | * | 2/2004 | |
| KR | 20090011739 | | 2/2009 | |
| KR | 20090011739 A | * | 2/2009 | |
| WO | 2017040909 A1 | | 3/2017 | |
| WO | 2017091239 | | 6/2017 | |

OTHER PUBLICATIONS

Metals Handbook, Desk Edition (1998).*
Construction Materials—Their Nature and Behaviour (4th Edition) (2010).*
Knovel Critical Tables (2nd edition) (2008).*
Partial machine translation of JP-56088470-A (1981).*
Knovel Critical Tables, 2nd edition, Magnesium Oxide entries (2008).*
Partial machine translation of CN-1259553-A.*
Partial machine translation of DE-3412234-C2.*
Partial machine translation of JP-S6050176-A.*
Lightweight and Sustainable Materials for Automotive Applications, Table 2.4 (excerpt) (2017).*
Partial machine translation of JP 2004-059721 A (Year: 2004).*
Partial machine translation of JP H06-306629 A (Year: 1994).*

* cited by examiner

COATING COMPOSITIONS HAVING IMPROVED CORROSION RESISTANCE

CROSS-REFERENCE TO RELATED APPLICATIONS

This application claims the benefit of U.S. Provisional Patent Application Ser. No. 62/608,062, filed on Dec. 20, 2017, incorporated herein by reference.

NOTICE OF GOVERNMENT SUPPORT

This invention was made with Government support under Government Contract No. N00014-17-C-1012 awarded by the Office of Naval Research; Collaboration Agreement No. 201636-140830, with National Center for Manufacturing Sciences, Inc. (NCMS), performed under Cooperative Agreement Award No. HQ0034-15-2-0007 awarded to NCMS by Tank Automotive Research Development and Engineering Center (TARDEC); and Government Contract No. W9132T-17-C-0021, awarded by Construction Engineering Research Laboratory. The United States Government has certain rights in this invention.

FIELD OF THE INVENTION

The present invention is directed towards curable film-forming coating compositions comprising metal particles, an alkaline earth metal compound and an organic film-forming binder.

BACKGROUND INFORMATION

Coatings are applied to appliances, automobiles, aircraft, and the like for a number of reasons, typically for decorative and/or protective purposes. For example, to improve the corrosion resistance of a metal substrate, corrosion inhibitors may be used in the coatings applied to the substrate. Improved corrosion resistance in coatings is desired, particularly without the use of carcinogenic materials.

SUMMARY OF THE INVENTION

The present invention is directed to a curable film-forming coating composition comprising metal particles; an alkaline earth metal compound comprising an alkaline earth metal oxide, an alkaline earth metal carbonate, an alkaline earth metal hydroxide, an alkaline earth metal sulfate, an alkaline earth metal monocarboxylate, an alkaline earth metal phosphate, or combinations thereof; and an organic film-forming binder; wherein the weight ratio of metal particles to alkaline earth metal compound is no more than 55:1 when the alkaline earth metal compound comprises magnesium oxide.

The present invention is also directed to a curable film-forming coating composition comprising metal particles; an alkaline earth metal compound comprising an alkaline earth metal oxide, an alkaline earth metal carbonate, an alkaline earth metal hydroxide, an alkaline earth metal sulfate, an alkaline earth metal monocarboxylate, an alkaline earth metal phosphate, or combinations thereof; and an organic film-forming binder; wherein the coating composition cures under ambient conditions or by heating to a temperature of 200° C. or less.

The present invention is further directed to a method of coating a substrate comprising applying the curable film-forming coating composition of the present invention to at least a portion of the substrate.

The present invention is further directed to a substrate coated at least in part with the curable film-forming coating composition of the present invention.

The present invention is directed to a method of making a multi-component curable film-forming coating composition comprising forming a first component by combining an organic film-forming resin and an alkaline earth metal compound; forming a second component by combining a curing agent and an aldehyde and/or ketone component having at least one aromatic ring comprising a ketone and/or aldehyde group and at least one pendant group represented by $-OR^1$, wherein each $R^1$ is independently selected from hydrogen, an alkyl group, or an aryl group; and combining metal particles with the first component, second component, an optional third component, or a combination thereof.

DETAILED DESCRIPTION OF THE INVENTION

As stated above, the present invention is directed to a curable film-forming coating composition comprising, consisting essentially of, or consisting of metal particles, an alkaline earth metal compound and an organic film-forming binder.

Metal Particles

According to the present invention, the curable film-forming coating composition comprises metal particles. As used herein, the term "metal particles" refers to elemental (i.e., zerovalent) metal and metal alloys. As used herein, the term "particles" refers to material in the form of particulates, such as powder or dust, as well as flakes, and may be in the form of any shape, such as, for example, spherical, ellipsoidal, cubical, rod-shaped, disk-shaped, prism-shaped, and the like.

The metal particles may comprise metals, metal alloys, or combinations thereof. The metal particles may comprise, consist essentially of, or consist of zinc, aluminum, zinc alloy, aluminum alloy, or combinations thereof. As used herein, the terms "zinc" or "zinc particles" when referring to metal particles refers to metal particles comprising at least 92% metallic zinc with the rest of the particle including impurities in the form of other metals or metal oxides, such as, for example, metal particles marketed as zinc powder or zinc dust, and includes metal particles having up to 100% metallic zinc. As used herein, the terms "aluminum" or "aluminum particles" when referring to metal particles refers to metal particles comprising at least 92% metallic aluminum with the rest of the particle including impurities in the form of other metals or metal oxides, such as, for example, metal particles marketed as aluminum powder or aluminum dust, and includes metal particles having up to 100% metallic aluminum. As used herein, an "aluminum alloy" refers to an alloy having aluminum as the predominant metal, such as an alloy comprising at least 50% by weight of aluminum, based on the total weight of the aluminum alloy. As used herein, a "zinc alloy" refers to an alloy having zinc as the predominant metal, such as an alloy comprising at least 50% by weight of zinc, based on the total weight of the zinc alloy. Some non-limiting examples of metal particles are described in U.S. Pat. Nos. 8,262,938, 8,277,688, 9,243,333, U.S. Pat. Nos. 9,243,150, 9,534,120, and U.S. application Ser. No. 14/950,835, each of which are incorporated herein by reference.

The metal particles may be subjected to a surface treatment to modify the surface of the metal particle. The surface treated metal particles may comprise a pretreatment layer formed by exposing the metal particle to a pretreatment composition. As used herein, the term "pretreatment composition" refers to a composition that upon contact with the substrate reacts with and chemically alters the substrate surface and binds to it to form a protective layer. The pretreatment composition used to modify the surface of the metal particles may comprise any known in the art for pretreating metal substrates. For example, suitable pretreatment compositions include, but are not limited to, zinc phosphate pretreatment compositions, such as, for example, those described in U.S. Pat. Nos. 4,793,867 and 5,588,989, or zirconium-containing pretreatment compositions, such as, for example, those described in U.S. Pat. Nos. 7,749,368 and 8,673,091. Other non-limiting examples of a pretreatment composition include those comprising trivalent chromium, hexavalent chromium, lithium salts, permanganate, rare earth metals, such as yttrium, or lanthanides, such as cerium. Another non-limiting example of a suitable surface pretreatment solution is a solgel, such as those comprising alkoxy-silanes, alkoxy-zirconates, and/or alkoxy-titanates.

The metal particles may comprise, consist essentially of, or consist of galvanically active metal particles. As used herein, the term "galvanically active metal particles" refers to metal or metal-alloy particles that are more active and less noble than the underlying substrate. The activity or nobility of a metal or metal-alloy may be determined by reference to the galvanic series, which ranks metal/metal alloys according to their electrical potential with reference to a standard electrode, such as provided in Atlas Steels' Atlas TECH NOTE NO. 7, "Galvanic Corrosion," August 2010 (with reference to a Standard Calomel Electrode (S.C.E.)). The use of galvanically active metal particles in the coating composition of the present invention may produce a sacrificial coating that preferentially oxidizes such that oxidation of the underlying substrate is reduced or prevented. Accordingly, what constitutes galvanically active metal particles will depend upon the substrate to which the coating composition is applied. For example, for mild steel substrates and more noble substrates the galvanically active metal particles may comprise, consist essentially of, or consist of particles of zinc, aluminum, zinc alloys or aluminum alloys. For example, for aluminum alloy substrates and more noble substrates, the galvanically active metal particles may comprise, consist essentially of, or consist of particles of aluminum or alloys thereof.

The metal particles may have an average particle size of at least 1 micron, such as at least 2 microns, such as at least 5 microns, such as at least 5.5 microns, such as at least 6 microns, and may be no more than 150 microns, such as no more than 30 microns, such as no more than 20 microns, such as no more than 10 microns, such as no more than 8 microns. The metal particles may have an average particle size of 1 to 150 microns, such as 2 to 30 microns, such as 5 to 20 microns, such as 5.5 to 10 microns, such as 6 to 8 microns. The particle size selected may be dependent upon the thickness of the desired coating. For example, thin coatings may require smaller particle sizes, while thicker coatings could tolerate larger particles. The average particle size as reported herein is the average particle size as provided by the metal particulate manufacturer, and may be measured by various methods known in the art.

The curable film-forming coating composition comprises at least 20% by weight metal particles, such as at least 25% by weight metal particles, such as at least 45% by weight metal particles, such as at least 55% by weight metal particles, such as at least 65% by weight metal particles, such as at least 70% by weight metal particles, such as at least 75% by weight metal particles, and may comprise no more than 95% by weight metal particles, such as no more than 90% by weight metal particles, such as no more than 85% by weight metal particles, based on the total solids weight of the coating composition. The curable film-forming coating composition comprises 20% to 95% by weight metal particles, such as 25% to 95% by weight metal particles, such as 45% to 95% by weight metal particles, such as 55% to 95% by weight metal particles, such as 65% to 90% by weight metal particles, such as 70% to 85% by weight metal particles, such as 75% to 85% by weight metal particles, such as 20% to 75% by weight metal particles, such as 30% to 70% by weight metal particles, such as 40% to 60% by weight metal particles, based on the total solids weight of the coating composition.

The curable film-forming coating composition comprises at least 10% by volume metal particles, such as at least 24% by volume metal particles, such as at least 30% by volume metal particles, such as at least 35% by volume metal particles, and may comprise no more than 65% by volume metal particles, such as no more than 60% by volume metal particles, such as no more than 55% by volume metal particles, based on the total solids volume of the coating composition. The curable film-forming coating composition comprises 10% to 65% by volume metal particles, such as 24% to 60% by volume metal particles, such as 30% to 60% by volume metal particles, such as 30% to 55% by volume metal particles, such as 35% to 55% by volume metal particles, based on the total solids volume of the coating composition.

The curable film-forming coating composition may comprise at least 30% by weight zinc particles, such as at least 45% by weight zinc particles, such as at least 55% by weight zinc particles, such as at least 65% by weight zinc particles, such as at least 75% by weight zinc particles, and may comprise no more than 95% by weight zinc particles, such as no more than 90% by weight zinc particles, such as no more than 85% by weight zinc particles, based on the total solids weight of the coating composition. The curable film-forming coating composition may comprise 30% to 95% by weight zinc particles, such as 45% to 95% by weight zinc particles, such as 55% to 95% by weight zinc particles, such as 65% to 90% by weight zinc particles, such as 75% to 85% by weight zinc particles, based on the total solids weight of the coating composition. The zinc alloy particles may be present in the curable film-forming coating composition in the same amounts as the zinc particles.

The curable coating composition may comprise at least 10% by volume zinc particles, such as at least 24% by volume zinc particles, such as at least 30% by volume zinc particles, and may comprise no more than 65% by volume zinc particles, such as no more than 60% by volume zinc particles, such as no more than 55% by volume zinc particles, based on the total solids volume of the coating composition. The curable film-forming coating composition may comprise 10% to 65% by volume zinc particles, such as 24% to 60% by volume zinc particles, such as 30% to 55% by volume zinc particles, based on the total solids volume of the coating composition. The zinc alloy particles may be present in the curable film-forming coating composition in the same amounts as the zinc particles.

The curable film-forming coating composition may comprise at least 20% by weight aluminum particles, such as at least 30% by weight aluminum particles, such as at least 40% by weight aluminum particles, and may comprise no more than 75% by weight aluminum particles, such as no more than 70% by weight aluminum particles, such as no more than 60% by weight aluminum particles, based on the total solids weight of the coating composition. The curable film-forming coating composition may comprise 20% to 75% by weight aluminum particles, such as 30% to 70% by weight aluminum particles, such as 40% to 60% by weight aluminum particles, based on the total solids weight of the coating composition. The aluminum alloy particles may be present in the curable film-forming coating composition in the same amounts as the aluminum particles.

The curable film-forming coating composition may comprise at least 20% by volume aluminum particles, such as at least 30% by volume aluminum particles, such as at least 35% by volume aluminum particles, and may comprise no more than 65% by volume aluminum particles, such as no more than 60% by volume aluminum particles, such as no more than 55% by volume aluminum particles, based on the total solids volume of the coating composition. The curable film-forming coating composition may comprise 20% to 65% by volume aluminum particles, such as 30% to 60% by volume aluminum particles, such as 35% to 55% by volume aluminum particles, based on the total solids volume of the coating composition. The aluminum alloy particles may be present in the curable film-forming coating composition in the same amounts as the aluminum particles.

According to the present invention, the curable film-forming coating composition may be substantially free, essentially free, or completely free of any of the specific metals or metal alloys described above. For example, the curable film-forming coating composition may be substantially free, essentially free, or completely free of zinc, aluminum, zinc alloy, aluminum alloy, or combinations thereof.

Alkaline Earth Metal Compound

According to the present invention, the curable film-forming coating composition comprises an alkaline earth metal compound. As used herein, an alkaline earth metal compound refers to compounds that comprise an alkaline earth metal in the +2 oxidation state and specifically excludes metals comprising elemental (zerovalent) alkaline earth metal. The alkaline earth metal compound may comprise beryllium, magnesium, calcium, strontium, barium, or combinations thereof. The alkaline earth metal may comprise, consist essentially of, or consist of an oxide, carbonate, hydroxide, sulfate, monocarboxylate, or phosphate of an alkaline earth metal, or combinations thereof. For example, the alkaline earth metal may comprise, consist of, or consist essentially of magnesium oxide, magnesium carbonate, magnesium hydroxide, magnesium sulfate, magnesium monocarboxylate (e.g., magnesium stearate), magnesium phosphate, calcium oxide, calcium carbonate, calcium hydroxide, calcium sulfate, calcium monocarboxylate, calcium phosphate, strontium oxide, strontium carbonate, strontium hydroxide, strontium sulfate, strontium monocarboxylate, strontium phosphate, barium oxide, barium carbonate, barium hydroxide, barium sulfate, barium monocarboxylate, barium phosphate, beryllium oxide, beryllium carbonate, beryllium hydroxide, beryllium sulfate, beryllium monocarboxylate, beryllium phosphate, or combinations thereof. It should be understood that the alkaline earth metal compound is separate and distinct from any metal oxidation products that may be found on the surface of the metal particles.

The alkaline earth metal compound may have any suitable average particle size according to the present invention. For example, the alkaline earth metal compound may be micron sized, such as 0.5 to 50 microns or 1 to 15 microns, with size based on average particle size. For example, the alkaline earth metal compound may be nano sized, such as 10 to 499 nanometers, or 10 to 100 nanometers, with size based on average particle size. Various coating composition preparation methods may result in the alkaline earth metal compound particles agglomerating, which could increase average particle size, or shearing or other action that can reduce average particle size.

The alkaline earth metal compound of the present invention may comprise ultrafine alkaline earth metal compound particles. As used herein, the term "ultrafine" refers to particles that have a B.E.T. specific surface area of at least 10 square meters per gram, such as 30 to 500 square meters per gram, such as 80 to 250 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

The alkaline earth metal compound of the present invention may comprise alkaline earth metal compound particles having a calculated equivalent spherical diameter of no more than 200 nanometers, such as no more than 100 nanometers, such as 5 to 50 nanometers. As will be understood by those skilled in the art, a calculated equivalent spherical diameter can be determined from the B.E.T. specific surface area according to the following equation: Diameter (nanometers)=$6000/[BET (m^2/g)*\rho (grams/cm^3)]$.

The alkaline earth metal compound of the present invention may comprise particles having an average primary particle size of no more than 100 nanometers, such as no more than 50 nanometers, such as no more than 25 nanometers, as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

The alkaline earth metal compound of the present invention may comprise particles having a geometry where at least one particle axis is no more than 200 nm, such no more than 100 nm, such as no more than 50 nm, such as no more than 25 nm. As used herein, the term "particle axis" refers to a straight-line distance from one distinct edge of the particle to another, such as the length, width, height, diameter, or any measurement from one edge to another where the measurement passes through the center of the particle.

The alkaline earth metal particles may have an affinity for the medium (e.g., solvent) of the coating composition sufficient to keep the particles suspended therein, wherein the affinity of the particles for the medium is greater than the affinity of the particles for each other, thereby reducing or eliminating agglomeration of the particles within the medium.

The shape (or morphology) of the alkaline earth metal particles may vary. For example, generally spherical morphologies may be used, as well as particles that are cubic, platy, polyhedric, or acicular (elongated or fibrous). The particles may be covered completely in a polymeric gel, not covered at all in a polymeric gel, or covered partially with a polymeric gel. As used herein, covered partially with a polymeric gel means that at least some portion of the particle has a polymeric gel deposited thereon, which, for example, may be covalently bonded to the particle or merely associated with the particle.

The curable film-forming coating composition may comprise at least 0.5% by weight alkaline earth metal compound, such as at least 1% by weight alkaline earth metal compound, such as at least 2% by weight alkaline earth metal compound, such as at least 3% by weight alkaline earth metal compound, such as at least 5% by weight alkaline earth metal compound, such as at least 6% by weight alkaline earth metal compound, and may comprise no more than 50% by weight alkaline earth metal compound, such as no more than 25% by weight alkaline earth metal compound, such as no more than 20% by weight metal particles, such as no more than 18% by weight alkaline earth metal compound, based on the total solids weight of the coating composition. The curable film-forming coating composition may comprise 0.5% to 50% by weight alkaline earth metal compound, such as 1% to 25% by weight alkaline earth metal compound, such as 2% to 20% by weight alkaline earth metal compound, such as 3% to 18% by weight alkaline earth metal compound, such as 5% to 18% by weight alkaline earth metal compound, such as 6% to 18% by weight alkaline earth metal compound, based on the total solids weight of the coating composition.

The curable film-forming coating composition may comprise at least 0.5% by volume alkaline earth metal compound, such as at least 2% by volume alkaline earth metal compound, such as at least 3% by volume alkaline earth metal compound, such as at least 5% by volume alkaline earth metal compound, and may comprise no more than 15% by volume alkaline earth metal compound, such as no more than 11% by volume alkaline earth metal compound, such as no more than 10% by volume metal particles, such as no more than 9% by volume alkaline earth metal compound, based on the total solids volume of the coating composition. The curable film-forming coating composition may comprise 0.5% to 15% by volume alkaline earth metal compound, such as 2% to 11% by volume alkaline earth metal compound, such as 3% to 10% by volume alkaline earth metal compound, such as 3% to 9% by volume alkaline earth metal compound, based on the total solids volume of the coating composition.

The alkaline earth metal compound may be present in an amount such that the curable film-forming coating composition has a weight ratio of metal particles to alkaline earth metal compound of at least 1:1, such as at least 1.5:1, such as at least 1.7:1, such as at least 1.8:1, such as at least 2:1, such as at least 2.5:1, and may be present in an amount of no more than 200:1, such as no more than 156:1, such as no more than 75:1, such as no more than 60:1, such as no more than 55:1, such as no more than 51:1. The alkaline earth metal compound may be present in an amount such that the curable film-forming coating composition has a weight ratio of metal particles to alkaline earth metal compound of 1:1 to 200:1, such as 1.5:1 to 156:1, such as 1.7:1 to 75:1, such as 1.8:1 to 60:1, such as 2:1 to 55:1, such as 2.5:1 to 51.1.

When the alkaline earth metal compound comprises magnesium oxide or magnesium carbonate, the alkaline earth metal compound may be present in an amount such that the curable film-forming coating composition has a weight ratio of metal particles to alkaline earth metal compound of at least 1:1, such as at least 1.5:1, such as at least 1.7:1, such as at least 1.8:1, such as at least 2:1, such as at least 2.5:1, and may be present in an amount of no more than 55:1, such as no more than 51:1, such as no more than 45:1, such as no more than 40:1. When the alkaline earth metal compound comprises magnesium oxide or magnesium carbonate, the alkaline earth metal compound may be present in an amount such that the curable film-forming coating composition has a weight ratio of metal particles to alkaline earth metal compound of 1:1 to 55:1, such as 1.5:1 to 51:1, such as 1.7:1 to 45:1, such as 1.8:1 to 40:1.

According to the present invention, the curable film-forming coating composition may be substantially free, essentially free, or completely free of any of the specific alkaline earth metal compounds described above. For example, the curable film-forming coating composition may be substantially free, essentially free, or completely free of magnesium oxide, magnesium carbonate, magnesium hydroxide, magnesium sulfate, magnesium monocarboxylate (e.g., magnesium stearate), magnesium phosphate, calcium oxide, calcium carbonate, calcium hydroxide, calcium sulfate, calcium monocarboxylate, calcium phosphate, strontium oxide, strontium carbonate, strontium hydroxide, strontium sulfate, strontium monocarboxylate, strontium phosphate, barium oxide, barium carbonate, barium hydroxide, barium sulfate, barium monocarboxylate, barium phosphate, beryllium oxide, beryllium carbonate, beryllium hydroxide, beryllium sulfate, beryllium monocarboxylate, and/or beryllium phosphate.

Organic Film-Forming Binder

According to the present invention, the curable film-forming coating composition further comprises an organic film-forming binder. The organic film-forming binder comprises an organic film-forming resin. As used herein, the term "film-forming resin" refers to resins that can form a self-supporting continuous film on at least a horizontal surface of a substrate upon removal of any diluents or carriers present in the composition or upon curing at ambient or elevated temperature. As used herein, a binder will be considered to be an "organic film-forming binder" if the binder comprises organic-based materials present in an amount of greater than 50% by weight, based on the total weight of the total binder composition, such as at least 51% by weight, such as at least 75% by weight, such as at least 85% by weight, such as at least 95% by weight, such as at least 99% by weight, and may be 100% by weight, based on the total weight of the binder. As used herein, the term "total weight of the binder" refers to the total weight of all resinous materials and curing agents present in the composition that are intended to react during cure to crosslink the binder. The organic film-forming binder may comprise 51% to 100% by weight of organic-based materials, such as 75% to 100% by weight, such as 85% to 100% by weight, such as 95% to 100% by weight, such as 99% to 100% by weight, such as 100% by weight, based on the total weight of the binder composition. The remainder of the binder may comprise inorganic materials present in an amount of less than 50% by weight, based on the total weight of the binder composition. The term "organic-based material" refers to carbon-based materials such as the organic film-forming resins and curing agents described herein. Organic-inorganic hybrid binders may also be considered to be organic film-forming binders if the organic content of the hybrid binder is greater than 50% by weight, based on the total weight of the organic-inorganic hybrid binder. The organic film-forming binder will comprise less than 50% by weight of inorganic elements, such as silicon and titanium, based on the total weight of the organic-based material. For clarity, the term organic-based material explicitly excludes inorganic binders, as that term is defined herein.

As used herein, the terms "thermosetting" and "curable" can be used interchangeably and refer to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition, page 856; Surface Coatings, vol. 2, Oil and Colour Chemists' Association, Australia, TAFE Educational Books (1974). Alternatively, curing or crosslinking reactions also may be carried out under ambient conditions for a period of 30 days or less, such as 21 days or less, such as 14 days or less, such as 7 days or less, or a shorter time period. By ambient conditions is meant that the coating undergoes a thermosetting reaction without the aid of heat or other energy, for example, without baking in an oven, use of forced air, or the like. Usually ambient conditions include temperature ranging from 60 to 90° F. (15.6 to 32.2° C.), such as a typical room temperature, 72° F. (22.2° C.), standard atmospheric pressure (101.325 kPa, 1.01325 bar or 1 atm) and about 30-65%, such as about 50% relative humidity. Once cured or crosslinked, a thermosetting resin will not melt upon the application of heat and is insoluble in solvents. The curable film-forming compositions of the present invention may be solvent-borne, 100% solids, or powder coating composition. The curable compositions comprise a curable organic film-forming binder component. The organic film-forming binder component may comprise (a) a film-forming resin component comprising reactive functional groups; and (b) a curing agent component comprising functional groups that are reactive with the functional groups in the resin component (a), although the film-forming resin component may also crosslink with itself rather than an additional curing agent (i.e. self-crosslinking binder).

Film-forming resins that may be used in the coating compositions of the present invention include, without limitation, those used in automotive OEM coating compositions, automotive refinish coating compositions, industrial coating compositions, architectural coating compositions, coil coating compositions, marine coating compositions, and aerospace coating compositions, among others.

The organic film-forming resin may comprise one or more of addition polymers, polyolefins, polysulfides, polyureas, polyesters, polyurethanes, polyamides, polyethers, polythioethers, polythioesters, polythiols, polyenes, polyols, polyacetoacetate, polysilanes, polysiloxanes, fluoropolymers, polycarbonates, and epoxy resins. Generally, these compounds, which need not be polymeric, can be made by any method known to those skilled in the art. The functional groups on the film-forming binder may comprise at least one of carboxylic acid groups, amine groups, epoxide groups, hydroxyl groups, thiol groups, carbamate groups, amide groups, urea groups, (meth)acrylate groups, styrenic groups, vinyl groups, allyl groups, aldehyde groups, acetoacetate groups, hydrazide groups, cyclic carbonates, acrylates, alkoxy silane groups, maleic and mercaptan groups. The functional groups on the film-forming resin are selected so as to be reactive with those on a curing agent, described herein, or to be self-crosslinking, and the film-forming resin may comprise two or more functional groups per molecule.

Suitable addition polymers include acrylic polymers and other polymers formed from reaction of unsaturated monomers, such as vinyls. Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl)acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. (Note: these epoxy functional monomers may also be used to prepare epoxy functional acrylic polymers.) Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 4 to 30 carbon atoms, such as butyl glycidyl ether, octyl glycidyl ether, phenyl glycidyl ether and para-(tertiary butyl) phenyl glycidyl ether. Particular glycidyl esters include those of the structure:

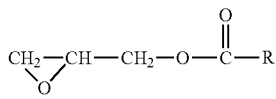

where R is a hydrocarbon radical containing from about 4 to about 26 carbon atoms. Typically, R is a branched hydrocarbon group having from about 4 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions, or can be prepared via organic solution polymerization techniques for solvent-borne compositions. When prepared via organic solution polymerization with groups capable of salt formation such as acid or amine groups, upon neutralization of these groups with a base or acid the polymers can be dispersed into aqueous medium. Generally, any method of producing such polymers that is known to those skilled in the art utilizing art recognized amounts of monomers can be used.

Besides acrylic polymers, the resin component (a) in the film-forming binder component of the curable film-forming composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil. Likewise, polyamides may be prepared utilizing polyacids and polyamines. Suitable polyacids include those listed above and polyamines may be selected from at least one of ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, urea, or others listed above may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the resin component (a) in the film-forming binder component of the curable film-forming composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate polymethylene polyphenyl isocyanate, and isocyanate trimers based on 1,6-hexamethylene diisocyanate or isophorone diisocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, or others listed above may be incorporated into the polyurethane as desired using suitably functional reactants if available, or conversion reactions as necessary to yield the desired functional groups. Such techniques are known to those skilled in the art.

Examples of polyether polyols are polyalkylene ether polyols which include those having the following structural formula:

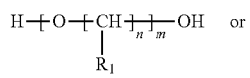

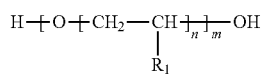

wherein the substituent $R_1$ is independently for each occurrence hydrogen or lower alkyl containing from 1 to 5 carbon atoms, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butyl ene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from Invista, and POLYMEG, available from Lyondell Chemical Co.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups. Examples of suitable amine functional polyethers include those sold under the name JEFF AMINE, such as JEFF AMINE D2000, a polyether functional diamine available from Huntsman Corporation.

Suitable epoxy functional polymers for use as the resin component (a) may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i.e., epoxy:polyhydroxyl group-containing material is typically from about 1.00:0.75 to 1.00:2.00.

The polyepoxide by definition has at least two 1,2-epoxy groups. In general, the epoxide equivalent weight of the polyepoxide will range from 100 to about 2,000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl) propane, 2,2-bis(4-hydroxy-3-tertiarybutylcyclohexyl)propane, 1,3-bis(hydroxymethyl)cyclohexane and 1,2-bis (hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as any of those disclosed above. The present invention may comprise epoxy resins such as diglycidyl ethers of Bisphenol A, Bisphenol F, glycerol, novolacs, and the like. Exemplary suitable polyepoxides are described in U.S. Pat. No. 4,681,811 at column 5, lines 33 to 58, the cited portion of which is incorporated by reference herein. Epoxy resin may also refer to polymers derived from epoxy-containing polymers.

Epoxy functional film-forming polymers may alternatively be addition polymer comprising the residue of unsaturated monomers wherein at least one unsaturated monomer comprises an epoxide functional group. The addition polymers may comprise acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins.

Epoxide functional groups may be incorporated into a resin by reacting hydroxyl groups on the resin with an epihalohydrin or dihalohydrin such as epichlorohydrin or dichlorohydrin in the presence of alkali.

Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minn. under the name FLUORAD; and perfluorinated hydroxyl functional (meth) acrylate resins.

The amount of the film-forming polymer in the curable film-forming composition may range from 25 to 100% by weight, based on the total weight of binder solids in the curable film-forming composition. For example, the film-forming polymer may be present in an amount of at least 25% by weight, such as at least 40% by weight, such as at least 50% by weight, and may be present in an amount of no more than 100% by weight, such as no more than 95% by weight, such as no more than 90% by weight, such as no more than 85% by weight, based on the total weight of binder solids in the curable film-forming composition. Ranges of film-forming polymer may include, for example, 25% to 100% by weight, such as 40% to 100% by weight, such as 50% to 100% by weight, such as 25% to 95% by weight, such as 40% to 95% by weight, such as 50% to 95% by weight, such as 25% to 90% by weight, such as 40% to 90% by weight, such as 50% to 90% by weight, such as 25% to 85% by weight, such as 40% to 85% by weight, such as 50% to 85% by weight, based on the total weight of binder solids in the curable film-forming composition. As used herein, the term "binder solids" refers to the organic film-forming binder and any other resinous materials included in the composition.

Suitable curing agents (b) for use in the organic film-forming binder of the curable film-forming compositions of the present invention include aminoplasts, phenolic resin, amino resin, polyisocyanates, including blocked isocyanates, polyepoxides, beta-hydroxyalkylamides, alkylated carbamate resin, (meth)acrylate, polyacids, anhydrides, alkoxysilanes, organometallic acid-functional materials, polyamines, polyamides, polysulfides, polythiols, polyenes such as polyacrylates, polyols, polysilanes, aldimines, ketimines, or other blocked amines, and mixtures of any of the foregoing, and include those known in the art for any of these materials. The curing agent may comprise two or more functional groups per molecule. The terms "curing agent", "crosslinking agent" and "crosslinker" are herein used interchangeably.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Allnex, under the trademark CYMEL and from INEOS under the trademark RESIMENE.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

Polyepoxides are suitable crosslinking agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described above, are also suitable as crosslinking agents.

Beta-hydroxyalkylamides are suitable curing agents for polymers having carboxylic acid groups. The beta-hydroxyalkylamides can be depicted structurally as follows:

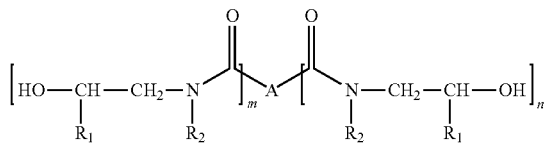

wherein $R_1$ is H or $C_1$ to $C_5$ alkyl; $R_2$ is H, $C_1$ to $C_5$ alkyl, or:

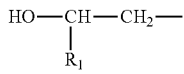

wherein $R_1$ is as described above; A is a bond or a polyvalent organic radical derived from a saturated, unsaturated, or aromatic hydrocarbon including substituted hydrocarbon radicals containing from 2 to 20 carbon atoms; m is equal to 1 or 2; n is equal to 0 or 2, and m+n is at least 2, usually within the range of from 2 up to and including 4. Most often, A is a C2 to C12 divalent alkylene radical.

Polyacids, particularly polycarboxylic acids, are suitable curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811, at column 6, line 45 to column 9, line 54, which is incorporated herein by reference.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Examples of suitable aliphatic diamines include, without limitation, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2, 4, 4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethy-1-4,4'-diamino-dicyclohexyl methane), 2,4- and/or 2,6-diaminotoluene and 2,4'- and/or 4,4'-diaminodiphenyl methane, or mixtures thereof. Cycloaliphatic diamines are available commercially from Huntsman Corporation (Houston, Tex.) under the designation of JEFFLINK such as JEFFLINK 754. Additional aliphatic cyclic polyamines may also be used, such as DESMOPHEN NH 1520 available from Covestro AG and/or CLEARLINK 1000, which is a secondary aliphatic diamine available from Dorf Ketal. POLYCLEAR 136 (available from BASF/Hansen Group LLC), the reaction product of isophorone diamine and acrylonitrile, is also suitable. Other exemplary suitable polyamines are described in U.S. Pat. No. 4,046,729 at column 6, line 61 to column 7, line 26, and in U.S. Pat. No. 3,799,854 at column 3, lines 13 to 50, the cited portions of which are incorporated by reference herein. Additional polyamines may also be used, such as ANCAMINE polyamines, available from Evonik Industries.

Suitable polyamides include any of those known in the art. For example, ANCAMIDE polyamides, available from Evonik Industries. Suitable polyenes may include those that are represented by the formula:

wherein A is an organic moiety, X is an olefinically unsaturated moiety and m is at least 2, typically 2 to 6. Examples of X are groups of the following structure:

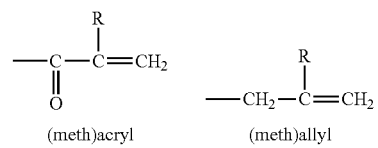

wherein each R is a radical selected from H and methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molar mass (Mn) of these compounds is often around 200 to 10,000. The molecule often contains on average 2 to 20 olefinic double bonds that are polymerizable by exposure to radiation. Aliphatic and/or cycloaliphatic (meth)acrylates in each case are often used. (Cyclo)aliphatic polyurethane (meth)acrylates and (cyclo)aliphatic polyester (meth)acrylates are particularly suitable. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth) acrylate and/or hydroxypropyl (meth)acrylate. The polyisocyanate can be reacted with the hydroxyalkyl (meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester (meth)acrylates are the reaction products of (meth)

acrylic acid or anhydride with polyols, such as diols, triols and tetrols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth)acrylate and pentaerythritol tetra(meth) acrylate.

Besides (meth)acrylates, (meth)allyl compounds or polymers can be used either alone or in combination with (meth)acrylates. Examples of (meth)allyl materials are polyallyl ethers such as the diallyl ether of 1,4-butane diol and the triallyl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the curable film-forming composition are numerous and can vary widely. Such polythiol functional materials can include those that are known in the art. Non-limiting examples of suitable polythiol functional materials can include polythiols having at least two thiol groups including compounds and polymers. The polythiol can have ether linkages (—O—), sulfide linkages (—S—), including polysulfide linkages (—Sx-), wherein x is at least 2, such as from 2 to 4, and combinations of such linkages.

The polythiols for use in the present invention include materials of the formula:

wherein $R^1$ is a polyvalent organic moiety and n is an integer of at least 2, typically 2 to 6.

Non-limiting examples of suitable polythiols include esters of thiol-containing acids of the formula HS—$R^2$—COOH wherein $R^2$ is an organic moiety with polyhydroxy compounds of the structure $R^3$—(OH)$_n$ wherein $R^3$ is an organic moiety and n is at least 2, typically 2 to 6. These components can be reacted under suitable conditions to give polythiols having the general structure:

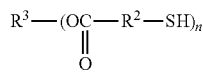

wherein $R^2$, $R^3$ and n are as defined above.

Examples of thiol-containing acids are thioglycolic acid (HS—CH2COOH), a-mercaptopropionic acid (HS—CH (CH3)-COOH) and β-mercaptopropionic acid (HS—CH2CH2COOH) with polyhydroxy compounds such as glycols, triols, tetrols, pentaols, hexaols, and mixtures thereof. Other non-limiting examples of suitable polythiols include ethylene glycol bis (thioglycolate), ethylene glycol bis(P-mercaptopropionate), trimethylolpropane tris (thioglycolate), trimethylolpropane tris (P-mercaptopropionate), pentaerythritol tetrakis (thioglycolate) and pentaerythritol tetrakis (P-mercaptopropionate), and mixtures thereof.

Suitable polyacids and polyols useful as curing agents include any of those known in the art, such as those described herein for the making of polyesters.

Appropriate mixtures of curing agents may also be used in the invention. The amount of the curing agent in the curable film-forming composition may range from 5% to 75% by weight, based on the total weight of binder solids in the curable film-forming composition. For example, the curing agent may be present in an amount of at least 5% by weight, such as at least 10% by weight, such as at least 15% by weight, and may be present in an amount of no more than may be 75% by weight, such as no more than 60% by weight, such as no more than 50% by weight, based on the total weight of binder solids in the curable film-forming composition. Ranges of curing agent may be, for example, 5% to 75% by weight, such as 5% to 60% by weight, such as 10% to 75% by weight, such as 10% to 60% by weight, such as 10% to 50% by weight, such as 15% to 75% by weight, such as 15% to 60% by weight, such as 15% to 50% by weight, based on the total weight of binder solids in the curable film-forming composition.

The resin component (a) may comprise epoxide functional groups and the curing agent component (b) may comprise amine functional groups.

The organic film-forming binder may be present in the curable film-forming coating composition in an amount of at least 4.5% by weight, such as at least 5% by weight, such as at least 7% by weight, such as at least 10% by weight, such as 11% by weight, such as at least 20% by weight, and may be present in an amount of no more than 75% by weight, such as no more than 50% by weight, such as no more than 40% by weight, such as no more than 30% by weight, such as no more than 25% by weight, based on the total solids weight of the coating composition. The organic film-forming binder may be present in the curable film-forming composition in an amount of 4.5% to 75% by weight, such as 5% to 50% by weight, such as 7% to 40% by weight, such as 20% to 40% by weight, such as 10% to 30% by weight, such as 11% to 25% by weight, based on the total solids weight of the coating composition.

The organic film-forming binder may be present in the curable film-forming coating composition in an amount of at least 10% by volume, such as at least 30% by volume, such as at least 35% by volume, such as at least 40% by volume, and may be present in an amount of no more than 90% by volume, such as no more than 80% by volume, such as no more than 70% by volume, such as no more than 65% by volume, based on the total solids volume of the coating composition. The organic film-forming binder may be present in the curable film-forming coating composition in an amount of 10% to 90% by volume, such as 30% to 80% by volume, such as 35% to 70% by volume, such as 40% to 65% by volume.

According to the present invention, the curable film-forming coating composition may also be substantially free, essentially free, or completely free of any of the film-forming polymers or curing agents described above.

According to the present invention, the curable film-forming coating composition may be substantially free, essentially free, or completely free of inorganic binders. As used herein, the term "inorganic binder" refers to purely inorganic binder systems that are primarily non-carbon-based materials upon cure, such as, for example, titanates, silicates and the like.

Other Optional Components

According to the present invention, the curable film-forming coating composition may optionally further comprise a liquid medium, and the coating composition may be in the form of a liquid coating composition. As used herein, the term "liquid medium" refers to a liquid material that serves as a carrier for the components of the curable film-forming coating composition that may be substantially or completely removed from the composition upon drying and/or curing. The liquid medium may comprise an organic solvent. The organic solvent may comprise any suitable organic solvent known in the art. When solvent is used as a liquid medium (i.e., diluent), the coating composition may be a solvent-borne coating composition. Solvent may be present in an amount such that the liquid medium is a non-aqueous liquid medium. As used herein, the term "non-aqueous medium" refers to a liquid medium comprising less than 50 weight % water, based on the total weight of the liquid medium. Such non-aqueous liquid mediums can comprise less than 40 weight % water, or less than 30 weight % water, or less than 20 weight % water, or less than 10 weight % water, or less than 5% water, or less than 1% water, based on the total weight of the liquid medium. The solvents that make up at least or more than 50 weight % of the liquid medium include organic solvents. Non-limiting examples of suitable organic solvents include polar organic solvents, e.g., protic organic solvents such as glycols, glycol ether alcohols, alcohols; and volatile ketones, glycol diethers, esters, and diesters. Other non-limiting examples of organic solvents include aromatic and aliphatic hydrocarbons.

The liquid medium may be present in the curable film-forming coating composition in an amount of 5-50% by weight, such as 5-40% by weight, such as 10-40% by weight, such as 10-30% by weight, such as 15-25% by weight, based on the total weight of the coating composition.

According to the present invention, the curable film-forming coating composition may be substantially free of a liquid medium, such as an organic solvent, wherein the coating composition is in the form of a co-reactable solid in particulate form, i.e., a powder coating composition.

According to the present invention, the curable film-forming coating composition may be substantially free of a liquid medium, such as an organic solvent, wherein the coating composition is in the form of a 100% solids composition. As used herein, a "100% solids composition" is a composition in a liquid form that comprises the materials that make up the coating film without a diluent, such as an organic solvent.

According to the present invention, the curable film-forming coating composition may optionally further comprise an aldehyde and/or ketone component comprising at least one aromatic ring comprising a ketone and/or aldehyde group and at least one pendant group represented by —$OR^1$, wherein each $R^1$ is independently selected from hydrogen, an alkyl group, or an aryl group. An "aldehyde component" refers to a monomer comprising at least one aldehyde group —C(=O)H, and a "ketone component" refers to a monomer comprising a ketone group —C(=O)$R^2$, where $R^2$ is a carbon-containing substituent including, but not limited to, an alkyl group or an aryl group, which are defined in further detail herein. The aldehyde and/or a ketone component also includes a non-volatile aldehyde and/or a ketone component. A "non-volatile aldehyde component" and "non-volatile ketone component" refers to an aldehyde and ketone component with a vapor pressure that is 140 pascals (Pa) or less at 25° C., as determined by ASTM D2879-10. Volatile components that are typically removed from the composition during cure and which are not used as a non-volatile aldehyde and/or a ketone component include, but are not limited to, acetone, methyl amyl ketone, methyl ethyl ketone, methyl propyl ketone, methyl isoamyl ketone, cyclohexanone, diacetone alcohol, methyl isobutyl ketone, diisobutyl ketone, diisoamyl ketone, diamyl ketone, isophorone, pentoxone, and C-11 ketone.

The aldehyde and/or ketone component can have a calculated molecular weight of less than 500 g/mole. The aldehyde and/or ketone component can also have a calculated molecular weight of less than 400 g/mole or less 300 g/mole. As will be understood by those skilled in the art, a calculated molecular weight is the sum of the atomic weights of each constituent element multiplied by the number of atoms of that element in the molecular formula.

Further, the aldehyde and/or ketone component used with the present invention comprises at least one aromatic ring comprising an aldehyde group and/or a ketone group. Thus, the aldehyde and/or ketone component comprises at least one aromatic ring having an aldehyde group represented by —C(=O)H, and/or a ketone group represented by —C(=O)$R^2$ in which $R^2$ is described above. As used herein, the term "aromatic" refers to a cyclically conjugated hydrocarbon with a stability (due to delocalization) that is significantly greater than that of a hypothetical localized structure. The aromatic ring can include aromatic carbocyclic or heteroaromatic ring structures. An "aromatic carbocyclic ring" refers to an aromatic ring with the aromatic group completely formed by bonded carbon atoms, and a "heteroaromatic ring" refers to an aromatic ring with at least one carbon atom of the aromatic group replaced by a heteroatom such as nitrogen, oxygen, sulfur, or a combination thereof.

In addition, the aromatic ring structure can comprise a monocyclic aromatic ring, a bicyclic aromatic ring, a polycyclic aromatic ring, or a combination thereof. A "monocyclic aromatic ring" refers to a single aromatic cyclic ring containing 3 to 18 carbon atoms such as 5 to 6 carbon atoms (i.e., a 5- or 6-membered ring). A "bicyclic aromatic ring" refers to two aromatic rings, each aromatic ring independently containing 3 to 18 carbon atoms such as 5 to 6 carbon atoms, in which one, two, or more atoms are shared between the two aromatic rings. A "polycyclic aromatic ring" refers to three or more aromatic rings, each aromatic ring independently containing 3 to 18 carbon atoms such as 5 to 6 carbon atoms, in which one, two, or more atoms of each aromatic ring are shared with at least one other aromatic ring that forms the polycyclic structure. It is appreciated that two or more monocyclic, bicyclic, and/or polycyclic aromatic rings can be used alone or bonded together to form the aldehyde and/or ketone component.

As previously described, the aldehyde and/or ketone component used with the present invention comprises an aromatic ring having an aldehyde and/or ketone group. A ketone group can be formed as part of the aromatic ring or an aldehyde and/or ketone group can be bonded to the aromatic ring as a pendant group (i.e., a chemical group other than hydrogen that is attached to and extends out from the aromatic ring). The aldehyde and/or ketone component also comprises at least one other pendant group bonded to the aromatic ring that is represented by —$OR^1$ in which each $R^1$ is independently selected form an alkyl group, hydrogen, or aryl group. In some instances, the aldehyde and/or ketone component does not include carboxylic acid groups (i.e., is completely free of carboxylic acid groups).

The term "alkyl" as used herein refers to an aliphatic (i.e., non-aromatic) linear, branched, and/or cyclic monovalent hydrocarbon radical. The alkyl group may include, but is not limited to, an aliphatic linear or branched $C_1$-$C_{30}$ monovalent hydrocarbon radical, or an aliphatic linear or branched $C_1$-$C_{20}$ monovalent hydrocarbon radical, or an aliphatic linear or branched $C_1$-$C_{10}$ monovalent hydrocarbon radical. The alkyl group may also include, but is not limited to, an aliphatic cyclic $C_3$-$C_{19}$ monovalent hydrocarbon radical, or an aliphatic cyclic $C_3$-$C_{12}$ monovalent hydrocarbon radical, or an aliphatic cyclic $C_5$-$C_7$ monovalent hydrocarbon radical.

Recitations of "linear, branched, or cyclic" groups, such as linear, branched, or cyclic alkyl are herein understood to include: a monovalent methyl group; groups that are linear, such as straight-chained $C_2$-$C_{30}$ alkyl groups; groups that are appropriately branched, such as branched $C_3$-$C_{30}$ alkyl groups, refers to an alkyl chain with a hydrogen replaced by a substituent such as an alkyl group that branches or extends out from a straight alkyl chain; and groups that are cyclic, such as cyclic $C_3$-$C_{19}$ alkyl groups, refers to a closed ring structure.

The alkyl group can be unsubstituted or substituted. A substituted alkyl group refers to an alkyl group where at least one hydrogen thereof has been optionally replaced or substituted with a group that is other than hydrogen. Such groups can include, but are not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, and alkyl groups present as sidechains, for example.

The term "aryl" refers to a substituent derived from an aromatic ring, such as a phenyl group for example. The aryl group can be derived from a monocyclic aromatic ring, a bicyclic aromatic ring, or a polycyclic aromatic ring. The aryl group can also include a heteroaryl group in which at least one carbon atom of the aromatic group is replaced by a heteroatom such as nitrogen, oxygen, sulfur, or a combination thereof. The aryl group can also include a substituted aryl group where at least one hydrogen thereof has been optionally replaced or substituted with a group that is other than hydrogen. Such groups can include, but are not limited to, any of the substituted groups previously described.

The aldehyde and/or ketone component can comprise at least one, at least two, at least three, or at least four additional pendant groups bonded to the aromatic ring that are represented by —OR$^1$ as defined above. For example, the aldehyde and/or ketone component used with the present invention can comprise an aromatic ring having an aldehyde and/or ketone group and two pendant groups represented by —OR$^1$ in which R$^1$ is a hydrogen for one of the pendant groups and an alkyl group for the second pendant group. As such, the aldehyde and/or ketone component used with the present invention can comprise an aromatic ring having an aldehyde and/or ketone group, a pendant hydroxyl group (—OH), and a pendant alkoxy group (—O-alkyl). It is appreciated that the pendant groups represented by —OR$^1$ can be bonded to multiple aromatic rings such as when a bicyclic or polycyclic aromatic ring is used or when multiple monocyclic rings are used.

The aromatic ring(s) of the aldehyde and/or ketone component may be further substituted with one or more groups different from those described above. Such groups can include, but are not limited to, alkyl groups, aryl groups, and other optional substituted groups as previously defined.

Non-limiting examples of aldehyde components that can be used include 2-hydroxybenzaldehyde, 3,5-di-tert-butyl-2-hydroxybenzaldehyde, 2-hydroxy-1-napthaldehyde, 2-hydroxy-3-methoxybenzaldehyde, 2-hydroxy-3-ethoxybenzaldehyde, 2-hydroxy-4-methoxybenzaldehyde, 2,3-dihydroxybenzaldehyde, 2,4-dihydroxybenzaldehyde, 3-methoxy-4-hydroxybenzaldehyde, 3,5-methoxy-4-hydroxybenzaldehyde, 3,4-dihydroxybenzaldehyde, and combinations thereof.

Non-limiting examples of ketone components that can be used include maltol, 2,4-dihydroxybenzophenone, 2-hydroxy-4-methoxybenzophenone, 2-hydroxy-4-n-octoxybenzophenone, 2,2',4,4'-tetrahydroxybenzophenone, and combinations thereof. It is appreciated that a ketone component can be used with or without an aldehyde component.

The aldehyde and/or ketone component may be present in the curable film-forming coating composition in an amount of 0.7% to 25% by weight, such as 1% to 10% by weight, based on the total solids weight of the coating composition.

According to the present invention, the curable film-forming coating composition may be substantially free, essentially free, or completely free of the aldehyde and/or ketone component described above. A curable film-forming composition is substantially free of the aldehyde and/or ketone component if the aldehyde and/or ketone component is present in an amount less than 0.7% by weight, based on the total weight of the coating composition. A curable film-forming composition is essentially free of the aldehyde and/or ketone component if the aldehyde and/or ketone component is present in an amount less than 0.1% by weight, based on the total weight of the coating composition. A curable film-forming composition is completely free of the aldehyde and/or ketone component if the aldehyde and/or ketone component is not present in the coating composition, i.e., 0.0% by weight, based on the total weight of the coating composition.

According to the present invention, the curable film-forming coating compositions of the present invention may optionally further comprise an amino acid. Amino acids will be understood by those skilled in the art as compounds having both acid and amine functionality, with side chains specific to each amino acid. The amino acid may be monomeric or oligomeric, including a dimer. When an oligomeric amino acid is used, the weight average molecular weight, as determined by GPC, of the oligomer is less than 1,000.

While any of the amino acids can be used according to the present invention, particularly suitable are histidine, arginine, lysine, cysteine, cystine, tryptophan, methionine, phenylalanine and tyrosine. It will be further understood that amino acids can be either L- or D-enantiomers, which are mirror images of each other, and that the L-configurations are typically found in proteins and nature and as such are widely commercially available. The term "amino acids" as used herein therefore refers to both the D- and L-configurations; however, according to the present invention, only the L- or only the D-configuration may be included if desired. Amino acids can be purchased, for example, from Sigma Aldrich, Thermo Fisher Scientific, Hawkins Pharmaceutical, or Ajinomato.

The amino acid can be present in any amount that improves the corrosion resistance of the coating. For example, the amino acids may be present in an amount of 0.1 to 20 wt %, such as 2 to 4 wt %, with wt %, based on the total solids in the coating composition.

Alternatively, the curable film-forming coating composition may be substantially free, essentially free or completely free of amino acid.

According to the present invention, the powder coating compositions of the present invention may optionally contain additives such as waxes for flow and wetting, flow control agents, such as poly(2-ethylhexyl)acrylate, degassing additives such as benzoin and MicroWax C, adjuvant resin to modify and optimize coating properties, antioxidants, ultraviolet (UV) light absorbers and catalysts. Examples of useful antioxidants and UV light absorbers include those available commercially from Ciba-Geigy under the trademarks IRGANOX and TINUVIN. These optional additives, when used, are typically present in combined amounts of up to 20% by weight, based on total weight of the coating composition. Alternatively, the powder coating composition may independently be substantially, essentially or completely free of each of these optional components.

The coating compositions of the present invention can also include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention. Alternatively, the coating composition may be substantially free, essentially free, or completely free of colorant.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, fillers including, but not limited to, micas, talc, clays, and inorganic minerals, anti-oxidants, hindered amine light stabilizers, UV light absorbers and stabilizers, surfactants, flow and surface control agents, thixotropic agents, organic co-solvents, reactive diluents, catalysts, reaction inhibitors, adhesion promoting agents such as organo-functional alkoxy-silanes, such as epoxy, amine, thiol, or isocyanate functional tri-, di-, or mono-, methoxy, ethoxy, or propoxy silanes, and other customary auxiliaries. Alternatively, the coating composition may be substantially free, essentially free, or completely free of any of the optional ingredients described herein.

According to the present invention, the film-forming coating composition may be substantially free, essentially free or completely free of magnesium metal particles. As used herein, the term "magnesium metal particles" refers to elemental (zerovalent) magnesium metal and magnesium alloy particles, and does not include compounds thereof, such as for example, the magnesium compounds as defined herein, except as possible particle surface impurities. As used herein, "magnesium alloy particles" refers to an alloy having magnesium as the predominant metal, such as an alloy comprising at least 51% by weight of magnesium, based on the total weight of the magnesium alloy, and does not include compounds thereof, such as for example, the magnesium compounds as defined herein, except as possible particle surface impurities. As used herein, a coating composition is substantially free of magnesium metal particles if magnesium metal particles are present in an amount of less than 5% by weight, based on the total composition weight. As used herein, a coating composition is essentially free of magnesium metal particles if magnesium metal particles present in an amount of less than 1% by weight, based on the total composition weight. As used herein, a coating composition is completely free of magnesium metal particles if magnesium metal particles are not present in the coating composition, i.e., 0.00% by weight, based on the total composition weight.

According to the present invention, the curable film-forming coating composition may be substantially free, essentially free, or completely free of zirconium-containing compounds. A curable film-forming coating composition is substantially free of zirconium-containing compounds if zirconium-containing compounds are present in an amount of less than 0.1% by weight, based on the total composition weight. A curable film-forming coating composition is essentially free of zirconium-containing compounds if zirconium-containing compounds are present in an amount of less than 0.002% by weight, based on the total composition weight. A curable film-forming coating composition is completely free of zirconium-containing compounds if zirconium-containing compounds are not present in the coating composition, i.e. 0.000% by weight, based on the total composition weight.

According to the present invention, the curable film-forming coating composition may be substantially free, essentially free, or completely free of microspheres. As used here, the term "microspheres" refers to rounded spheres of glass, ceramic or polymeric material that may be solid or hollow. The microspheres may have a $D_{50}$ particle diameter of 10 to 120 microns. A curable film-forming coating composition is substantially free of microspheres if microspheres are present in an amount of less than 0.1% by weight, based on the total coating composition weight. A curable film-forming coating composition is essentially free of microspheres if microspheres are present in an amount of less than 0.01% by weight, based on the total coating composition weight. A curable film-forming coating composition is completely free of microspheres if microspheres are not present in the coating composition, i.e., 0.00% by weight, based on the total coating composition weight.

According to the present invention, the curable film-forming coating composition may be substantially free, essentially free, or completely free of organic phosphorus compounds. As used herein, the term "organic phosphorus compounds" refers to compounds containing phosphates, phosphites, or phosphonates, and their amine salts or polycondensates. Specific examples include tris(nonylphenyl) phosphate, trixylenyl phosphate, tricresyl phosphate, trioleyl phosphate, tridodecyl phosphate, trioctyl phosphate, tris(2-ethylhexyl) phosphate, tributyl phosphate, triethyl phosphate, tris(butoxyethyl) phosphate, tris(β-chloroethyl) phosphate, tris(2,3-dichloropropyl) phosphate, tris(2,3-dibromopropyl) phosphate, tributyl thiophosphate, tridodecyl thiophosphate, trioleyl thiophosphate, etc.; tris (nonylphenyl) phosphite, trixylenyl phosphite, tricresyl phosphite, triphenyl phosphite, trioleyl phosphite, tri(tridecyl) phosphite, tridodecyl phosphite, tridecyl phosphite, tris(2-ethylhexyl) phosphite, tributyl phosphite, diphenyl decyl phosphite, phenyl didecyl phosphite, tris(nonylphenoxy ethoxy ethyl) phosphite, tris(butoxy)ethyl phosphite, tris[2-(2-butoxyethoxy)ethyl] phosphite, diphenyl[2-(2-ethoxyethoxy)ethyl] phosphite, tris(dipropylene glycol) phosphite, tridodecyl trithiophosphite, etc.; dibutyl butyl phosphonate, di(2-ethylhexyl) 2-ethylhexyl phosphonate, dioctyl octyl phosphonate, didodecyl dodecyl phosphonate, dioleyl oleyl phosphonate, dibutoxyethyl butoxyethyl phosphonate, etc.; mono or dioleyl phosphate, mono or didodecyl phosphate, mono or di-2-ethylhexyl phosphate, mono or di-n-butyl phosphate, mono or diisobutyl phosphate, mono or di-sec-butyl phosphate, mono or diisopropyl phosphate, mono or diethyl phosphate, etc. and their amine salts; amine salts of acidic phosphoric esters derived from alcohols obtained by addition of dodecanol or oleyl alcohol to ethylene oxide or propylene oxide; mono or bis(nonylphenyl) phosphite, mono or diphenyl phosphite, mono or dioleyl phosphite, mono or didodecyl phosphite, mono or di(2-ethylhexyl) phosphite, mono or di-n-butyl phosphite, mono or diisobutyl phosphite, mono or di-sec-butyl phosphite, mono or diisopropyl phosphite, mono or diethyl phosphite, etc. and their neutralization products with amines; di-2-ethylhexyl hydroxymethyl phosphonate, dibutyl hydroxymethyl phosphonate, etc.; dialkyl dithiophosphates and diaryl dithiophosphates such as diisopropyl dithiophosphate, di-sec-butyl dithiophosphate, diisobutyl dithiophosphate, di-n-butyl dithiophosphate, di-2-ethylhexyl dithiophosphate, dinonylphenyl dithiophosphate, dicresyl dithiophosphate and diphenyl dithiophosphate and their amine salts; pyrophosphoric esters and polyphosphoric esters, and their amine salts; polycondensed organic phosphorus compounds such as dioleyl pentaerythritol diphosphite, tetraoleyl-4,4'-isopropylidenediphenol diphosphite, tetranonylphenyl-4,4'-isopropylidene dicyclohexyl diphosphite, diisodecylpentaerythritol diphosphite, tetraphenyldipropylene glycol diphosphite, bis(neopentylglycol) triethylene glycol diphosphite, tetrakis(nonylphenyl)polypropylene glycol diphosphite, diphenyl diisodecyl neopentyl glycol diphosphite, dineopentyl glycol propylene glycol diphosphite, dineopentyl glycol triethylene glycol diphosphite, dineopentyl glycol dipropylene glycol diphosphite, tetranonylphenyl dipropylene glycol diphosphite, tetrakis[2-(2-ethoxyethoxy)ethyl] dipropylene glycol diphosphite, tetrakis(2-phenoxyethyl)dineopentyl glycol diphosphite, tetrakis(nonylphenoxytetraethylenoxy)neopentyl glycol diphosphite, diphenyl didecyl(2,2,4-trimethyl-1,3-pentanediol) diphosphite, heptakis(dipropylene glycol) triphosphite, octaphenylpentakis(dipropylene glycol) hexaphosphite, decaphenylheptakis(dipropylene glycol) octaphosphite, decakis(nonylphenyl)heptakis(dipropylene glycol) octaphosphite, decakis(nonylphenyl)heptakis(neopentyl glycol) octaphosphite, deca-2-ethylhexylheptakis (dipropylene glycol) octaphosphite, decadodecylheptakis (dipropylene glycol) octaphosphite, diallyl phosphite, vinyl phosphonic ester, etc.; special phosphonates such as tris (dipropylene glycol)bis(hydroxymethane) diphosphonate and bis(dipropylene glycol)-α-hydroxy-β',β',β'-trichloroethane phosphonate, and quaternary phosphonium compounds such as methyltrioctyl phosphonium dimethyl phosphate. A curable film-forming coating composition is substantially free of organic phosphorus compounds if organic phosphorus compounds are present in an amount of less than 1% by weight, based on the total coating composition weight. A curable film-forming coating composition is essentially free of organic phosphorus compounds if organic phosphorus compounds are present in an amount of less than 0.7% by weight, based on the total coating composition weight. A curable film-forming coating composition is completely free of organic phosphorus compounds if organic phosphorus compounds are not present in the coating composition, i.e., 0.0% by weight, based on the total coating composition weight.

According to the present invention, the curable film-forming coating composition may be substantially free, essentially free or completely free of organic-inorganic hybrid binder materials.

The curable film-forming coating composition may comprise, consist essentially of, or consist of an epoxy film-forming resin, a polyamine curing agent, aluminum alloy particles, and an alkaline earth metal compound comprising, consisting essentially of, or consisting of magnesium oxide, magnesium hydroxide, magnesium carbonate, magnesium monocarboxylate, magnesium sulfate, calcium oxide, calcium hydroxide, calcium carbonate, calcium monocarboxylate, calcium sulfate, barium oxide, barium hydroxide, barium carbonate, barium monocarboxylate, barium sulfate, or combinations thereof, and optionally an organic solvent. The aluminum alloy particles may optionally be pretreated.

The curable film-forming coating composition may comprise, consist essentially of, or consist of an epoxy film-forming resin, a polyamine curing agent, aluminum alloy particles, and magnesium oxide, and optionally an organic solvent. The aluminum alloy particles may optionally be pretreated.

The curable film-forming coating composition may comprise, consist essentially of, or consist of an epoxy film-forming resin, a polyamine curing agent, zinc particles, and an alkaline earth metal compound comprising, consisting essentially of, or consisting of magnesium oxide, magnesium hydroxide, magnesium carbonate, magnesium monocarboxylate, magnesium sulfate, calcium oxide, calcium hydroxide, calcium carbonate, calcium monocarboxylate, calcium sulfate, barium oxide, barium hydroxide, barium carbonate, barium monocarboxylate, barium sulfate, or combinations thereof, and optionally an organic solvent.

The curable film-forming coating composition may comprise, consist essentially of, or consist of an epoxy film-forming resin, a polyamine curing agent, zinc particles, and magnesium oxide, and optionally an organic solvent.

According to the present invention, the curable film-forming coating composition may be in the form of a single component coating composition. A single component coating composition will be understood as referring to a composition wherein all the coating components are maintained in the same container after manufacture, during storage, etc. A typical single component coating composition may be applied to a substrate and cured by any conventional means, such as by heating, forced air, radiation cure and the like.

The single component coating composition may also be cured by exposure to ambient conditions. For some coatings, it is not practical to store them as a one-package, but rather they must be stored as multi-component coating compositions with the reactive components (e.g., film-forming polymer and curing agent) stored separately to prevent the components from curing prior to use. The term "multi-component coating composition" means coatings in which various components are maintained separately until just prior to application. The multi-component coating compositions may have any number of separately stored components, such as, for example, two-components, three-components, or four-components coating compositions.

According to the present invention, the curable film-forming coating composition may be in the form of a single component coating composition, wherein the metal particles, alkaline earth metal compound and organic binder are present in a single container. Solvent may also optionally be present.

According to the present invention, the curable film-forming coating composition may comprise metal particles, an alkaline earth metal compound, and an organic binder comprising an organic film-forming resin and a curing agent, and the coating composition may be in the form of a multi-component coating composition comprising a first component comprising the organic film-forming resin; and a second component comprising the curing agent; and wherein the metal particles and/or alkaline earth metal compound are present in the first component, the second component, an optional third component, or combinations thereof. Additionally, solvent may optionally be present, and if present, a portion or all of the solvent may be present in any of the three components or in an optional fourth component. Furthermore, a portion or all of the other optional ingredients described herein, when present, may be included in any of the components described herein. Although the film-forming resin and curing agent are described as being present in separate components, it should be understood that at least a portion of either component may optionally be present in another component of the coating composition.

The curable film-forming coating compositions of the present invention may be formed by mixing the metal particles, alkaline earth metal compound, organic film-forming binder and any of the other optional components. All the components can be mixed in a non-aqueous medium such as the non-aqueous medium previously described. The mixing can include a milling process as recognized by one skilled in the art.

The present invention is also directed to a method of making a multi-component curable film-forming coating composition comprising: forming a first component by combining an organic film-forming resin and an alkaline earth metal compound; forming a second component by combining a curing agent and an aldehyde and/or ketone component having at least one aromatic ring comprising a ketone and/or aldehyde group and at least one pendant group represented by —OR$^1$, wherein each R$^1$ is independently selected from hydrogen, an alkyl group, or an aryl group; and combining metal particles with the first component, second component, an optional third component, or a combination thereof. Additionally, solvent may optionally be present, and if present, a portion or all of the solvent may be present in any of the first component, second component, optional third component, or in an optional fourth component.

The curable powder coating compositions of the present invention can be prepared, for example, by first dry blending the film-forming resin, metal particles, alkaline earth metal compound, and any of the optional additives described above, in a blender, such as a Henschel blade blender. The blender is operated for a period of time sufficient to result in a homogenous dry blend of the materials. The blend is then melt-blended in an extruder, such as a twin screw co-rotating extruder, operated within a temperature range sufficient to melt but not gel the components. The melt-blended curable powder coating composition may be milled to an average particle size of from, for example, 15 to 80 microns. Other methods known in the art can also be used.

The present invention is also directed to methods of coating a substrate comprising applying the curable film-forming coating composition of the present invention to at least a portion of the substrate. The method may further comprise subjecting the substrate to curing conditions sufficient to at least partially cure the applied coating composition. The curing conditions may comprise any known in the art, such as, for example, air drying the composition under ambient conditions, heating the coated substrate, subjecting the coated substrate to UV radiation, and/or forced air curing. The method of coating may further comprise other optional steps, such as cleaning and/or degreasing the substrate, grit blasting the substrate surface, anodizing the substrate, pretreating the substrate prior to coating, such as by a metal phosphate pretreatment composition, a zirconium pretreatment composition, a trivalent chromium pretreatment composition, a solgel pretreatment composition, or a rare earth metal pretreatment composition, or other pretreatment compositions. The method may also optionally further comprise applying an additional coating layer, such as a primer, basecoat, or topcoat. The additional coating layers may be formed from a coating composition that includes a film-forming resin that is the same or different from the curable film-forming coating composition of the present invention. The additional coating layers can be prepared with any of the film-forming resins, crosslinkers, colorants, and/or other components previously described.

The curable film-forming coating compositions can be applied to a wide range of substrates known in the coatings industry. For example, the coating compositions of the present invention can be applied to automotive substrates (e.g., automotive vehicles including but not limited to cars, buses, trucks, trailers, etc.), industrial substrates, aerospace vehicles and aerospace vehicle components, marine substrates and components such as ships, vessels, and on-shore and off-shore installations, storage tanks, windmills, nuclear plants, packaging substrates, wood flooring and furniture, apparel, electronics, including housings and circuit boards, glass and transparencies, sports equipment, including golf balls, stadiums, buildings, bridges, and the like. These substrates can be, for example, metallic or non-metallic.

The metallic substrates comprise metal or metal alloy and may comprise cold rolled steel, hot rolled steel, steel coated with zinc metal, zinc compounds, or zinc alloys, such as electrogalvanized steel, hot-dipped galvanized steel, galvanealed steel, blasted/profiled steel, and steel plated with zinc alloy. As used herein, blasted or profiled steel refers to steel that has been subjected to abrasive blasting and which involves mechanical cleaning by continuously impacting the steel substrate with abrasive particles at high velocities using compressed air or by centrifugal impellers. The abrasives are typically recycled/reused materials and the process can efficiently removal mill scale and rust. The standard grades of cleanliness for abrasive blast cleaning is conducted in accordance with BS EN ISO 8501-1. Aluminum alloys of the 1XXX, 2XXX (such as the 2024 alloy), 3XXX, 4XXX, 5XXX, 6XXX, or 7XXX (such as the 7075 alloy) series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate optionally may be pretreated with a pretreatment composition as known in the art. Suitable pretreatment compositions include, but are not limited to, those described above used to pretreat the metal particles. The substrate may also be anodized, including, but not be limited to, phosphoric acid anodized, sulfuric acid anodized, boric-sulfuric acid anodized, tartaric-sulfuric acid anodized. Alternatively, the substrate may be a non-pretreated substrate, such as a bare substrate, that is not pretreated by a pretreatment solution.

Further, non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, polyethylene terephthalate) (PET), polycarbonate, polycarbonate acrylobutadiene styrene (PC/ABS), polyamide, composites, such as, for example, carbon fiber reinforced polymer composites, wood, veneer, wood composite, particle board, medium density fiberboard, cement, stone, glass, paper, cardboard, textiles, leather both synthetic and natural, and the like. It is appreciated that the coating compositions can be applied to various areas of any of the previously described substrates to form a continuous solid coating such as over the body and edges of a substrate and which provides the superior properties described herein.

The coating composition of the present invention can be applied to a substrate to form a monocoat. As used herein, a "monocoat" refers to a single layer coating system that is free of additional coating layers. Thus, the coating composition of the present invention can be applied directly to a substrate and cured to form a single layer coating, i.e., a monocoat.

Alternatively, the coating composition of the present invention may be applied to a substrate as a first coating layer along with additional coating layers, such as a second coating layer, to form a multi-layer coating system. It is appreciated that the multi-layer coating can comprise multiple coating layers such as three or more, or four or more, or five or more, coating layers. For example, the previously described coating composition of the present invention may be applied to a substrate as a primer and second and third coating layers, and optionally additional coatings layers, can be applied over the primer layer as basecoats and/or topcoats. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact, and which may be overcoated with a protective and decorative topcoat.

The additional coating layers, such as a second and third coating layer, can be formed from a coating composition that includes a film-forming resin that is the same or different from the first coating layer. The additional coating layers can be prepared with any of the film-forming resins, cross-linkers, colorants, and/or other components previously described. Further, each coating composition can be applied as a dry-on-dry process where each coating composition is dried or cured to form a coating layer prior to application of another composition coating. Alternatively, all or certain combinations of each coating composition described herein can be applied as a wet-on-wet process and dried or cured together.

According to the present invention, the curable film-forming coating composition and/or layers deposited from the same, as well as any pretreatment layer, primer layer or topcoat layer, may be substantially free, essentially free, or completely free of chromium or chromium-containing compounds. As used herein, the term "chromium-containing compound" refers to materials that include trivalent chromium or hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate. When the curable film-forming coating composition and/or layers deposited from the same, as well as any pretreatment layer, primer layer or topcoat layer, is substantially free, essentially free, or completely free of chromium, this includes chromium in any form, such as, but not limited to, the trivalent chromium-containing compounds and hexavalent chromium-containing compounds listed above.

A curable film-forming coating composition and/or layers deposited from the same, as well as any pretreatment layer, primer layer or topcoat layer, that is substantially free of chromium or chromium-containing compounds means that chromium or chromium-containing compounds are not intentionally added, but may be present in trace amounts, such as because of impurities or unavoidable contamination from the environment. In other words, the amount of material is so small that it does not affect the properties of the composition; this may further include that chromium or chromium-containing compounds are not present in the coating composition and/or layers deposited from the same, as well as any pretreatment layer, primer layer or topcoat layer, in such a level that they cause a burden on the environment. The term "substantially free" means that the curable film-forming coating composition and/or layers deposited from the same, as well as any pretreatment layer, primer layer or topcoat layer, contain less than 10 ppm of chromium, based on total solids weight of the composition, the layer, or the layers, respectively, if any at all. The term "essentially free" means that the curable film-forming coating composition and/or layers deposited from the same, as well as any pretreatment layer, primer layer or topcoat layer, contain less than 1 ppm of chromium, based on total solids weight of the composition or the layer, or layers, respectively, if any at all. The term "completely free" means that the curable film-forming coating composition and/or layers comprising the same, as well as any pretreatment layer, primer layer or topcoat layer, contain less than 1 ppb of chromium, based on total solids weight of the composition, the layer, or the layers, respectively, if any at all.

According to the present invention, the curable film-forming coating composition and/or layers deposited from the same, may be substantially free, essentially free, or completely free of metal polycarboxylate compounds. As used herein, the term "metal polycarboxylate compound" refers to compounds of metal cations and polycarboxylate polyanions having at least two carboxylic acid groups. Non-limiting examples of metal cations include elements chosen from: Group 1, such as lithium, potassium and sodium, Group 2, such as magnesium, calcium, strontium, and barium, Group 3, such as scandium, yttrium, lanthanum, other lanthanides such as cerium, praseodymium, neodymium, samarium, europium, gadolinium, etc., Group 4, such as titanium and zirconium, Group 5, such as vanadium and niobium, Group 6, such as chromium and molybdenum, Group 7, such as manganese, Group 8, such as iron, cobalt and nickel, Group 11, such as copper, Group 12, such as zinc, Group 13, such as aluminum, and Group 15, such as bismuth. As used herein, the Group number refers to the groups 1 through 18 as defined by the International Union of Pure and Applied Chemistry (IUPAC). Non-limiting examples of polycarboxylate polyanions include linear and branched aliphatic molecules like oxalate, tartrate, succinate, adipate, citrate, and the like, and aromatic molecules like phthalate, diphenate, meditate and trimellitate, and the like. As used herein, the terms "substantially free" and "essentially free" with respect to the metal polycarboxylate compounds means the metal polycarboxylate compounds are present, if at all, in an amount of 0.1% by weight or less and 0.01% by weight or less, respectively, based on the total binder solids weight of the coating composition.

The present invention is also directed to a method of refinishing a surface of an article comprising a metal substrate. The method comprises: (a) removing a defect from the surface; (b) applying a first coating layer deposited from a coating composition directly to at least a portion of the surface of the metal substrate; and optionally (c) applying a second coating layer over at least a portion of the first coating layer. The first coating layer can be formed from (b), the curable film-forming coating composition of the present invention. It is appreciated that the method can include various steps of applying additional coating layers as well such as a third, fourth, fifth, or more, coating layers, as well as pretreatment layers applied to the substrate prior to the coatings. Further, the additional coating layers, such as a second and third coating layer, can be formed from a coating composition that includes a film-forming resin that is the same or different from the first coating layer. The additional coating layers can be prepared with any of the film-forming resins, crosslinkers, colorants, and/or other components previously described.

The coating compositions of the present invention can be applied by any means standard in the art, such as electrocoating, spraying, electrostatic spraying, dipping, rolling, brushing, and the like. It is appreciated that the coatings can also be applied in dry forms such as powder or films. The coatings formed from the coating compositions of the present invention can be applied to a dry film thickness of 2.5 to 500 microns, 2.5 to 100 microns, 2.5 to 75 microns, 5 to 50 microns, or 25 to 60 microns. When used as a fire protection coating, the dry film thickness can be 1,000-70,000 microns.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils (25 to 254 micrometers), such as about 2 to 4 mils (50 to 101.6 micrometers). Other standard methods for coating application of the powder coating also can be employed such as brushing, dipping or flowing.

After application of the composition to the substrate, a film may be formed on the surface of the substrate by driving solvent out of the film by heating or by an air-drying period. Suitable drying conditions will depend on the particular composition and/or application, but an exemplary drying time of from about 1 to 5 minutes at a temperature of about 60 to 250° F. (15.6 to 121° C.), such as 70 to 212° F. (27 to 100° C.) may be sufficient. More than one coating layer of the present composition may be applied if desired. Between coats, the previously applied coat may be flashed; that is, exposed to ambient conditions for a desired amount of time.

After application of the curable film-forming coating composition to a substrate, the coating composition may be cured by any means known in the art. For example, the coating may be subjected to curing conditions sufficient to cure the coating composition. For example, the coating composition may be subjected to curing conditions such as ambient conditions, as discussed above, for a period of hours or days. Alternatively, the substrate may be subjected to curing conditions such as radiation (e.g., UV radiation) or heated to a temperature and for a time sufficient to cure the coating.

During curing of the coating, solvents volatilize and crosslinkable components of the composition react and are crosslinked. The curing operation may be carried out at a temperature in the range of from 60 to 250° F. (15.6 to 121° C.), such as 70 to 212° F. (27 to 100° C.) but, if needed, lower or higher temperatures may be used. The use of elevated temperature may hasten the cure. An example would be forced air curing in a down draft booth at about 40° C. to 60° C., which is common in the automotive refinish industry. However, as noted previously, the coatings of the present invention may also cure under ambient conditions without the addition of heat or a forced air-drying step. Additionally, a first coating composition may be applied and then a second applied thereto "wet-on-wet". Alternatively, the first coating composition can be cured before application of one or more additional coating layers.

According to the present invention, liquid coating compositions described herein may be cured at ambient conditions or they can be cured at elevated temperatures to hasten the cure. The ambient condition curable compositions may be prepared as two or multi-component compositions in which the curing agent is kept separate from the film-forming resin containing the reactive functional group. The components are combined shortly before application. The ambient condition curable compositions may also be prepared as one-component compositions.

According to the present invention, after application of the curable powder film-forming coating composition, the coated substrate can be heated to a temperature and for a time sufficient to cure the coating. Metallic substrates with powder coatings may be cured at a temperature ranging from 250° F. to 500° F. (121.1° C. to 260.0° C.) for 1 to 60 minutes, or from 300° F. to 400° F. (148.9° C. to 204.4° C.) for 15 to 30 minutes, or at temperatures of 392° F. (200° C.) or less for 15 to 30 minutes, such as temperatures of such as 121.1° C. to 200° C., such as 150° C. to 200° C. The curing time may be dependent upon the curing temperature as well as other variables, for example, the film thickness of the deposited coating, type of curing agent employed, and the like. For purposes of the present invention, all that is necessary is that the time be sufficient to effect cure of the coating on the substrate.

The present invention is also directed to a substrate coated at least in part with the curable film forming coating composition of the present invention.

It was found that the coating compositions of the present invention provide good corrosion resistance when applied to a metallic substrate and cured to form a coating. The coating compositions were found to provide good corrosion resistance when used as a single layer monocoat and when used in a multi-layer coating system. For example, the coating compositions described herein, when used as a monocoat and in a multi-layer coating system, were found to provide good corrosion creep when tested under ASTM B117 and SAE J2334.

According to the present invention, the curable film-forming coating compositions of the present invention may reduce scribe corrosion on steel substrates by at least 15%, such as at least 25%, such as at least 40%, such as at least 50%, such as at least 60%, such as at least 75%, when compared to a comparable coating composition that does not include metal particles and an alkaline earth metal compound, as measured according to ASTM B117 exposure for at least 1,000 hours.

According to the present invention, the curable film-forming coating compositions of the present invention may reduce scribe corrosion on aluminum substrates by at least 15%, such as at least 25%, such as at least 40%, such as at least 50%, such as at least 60%, such as at least 75%, when compared to a comparable coating composition that does not include metal particles and an alkaline earth metal compound, as measured according to ASTM B117 exposure for at least 1,000 hours.

According to the present invention, the curable film-forming coating compositions of the present invention may reduce scribe creep on steel substrates by at least 56%, such as by at least 50%, such as by at least 45%, such as by at least 40%, such as by at least 25%, such as by at least 15%, when compared to a comparable coating composition that does not include metal particles and an alkaline earth metal compound, as measured according to SAE J2334 following exposure for 70 cycles.

According to the present invention, the curable film-forming coating composition comprising aluminum or aluminum alloy particles and an alkaline earth metal compound applied to an aluminum substrate may improve scribe appearance rating as visually rated according to TABLE 9 after 548 hours, 840 hours, 1,032 hours, or 3,000 hours of salt spray testing according to ASTM B-117 by a value of at least 5, such as a value of at least 4, such as a value of at least 3, such as a value of at least 2, such as a value of at least 1, when compared to a comparable coating composition that includes aluminum alloy particles but not an alkaline earth metal compound.

According to the present invention, the curable film-forming coating composition comprising aluminum or aluminum alloy particles and an alkaline earth metal compound applied to an aluminum substrate may improve scribe corrosion rating as visually rated according to TABLE 9 after 548 hours, 840 hours, 1,032 hours, or 3,000 hours of salt spray testing according to ASTM B-117 by a value of at least 4, such as a value of at least 3, such as a value of at least 2, such as a value of at least 1, when compared to a comparable coating composition that includes aluminum alloy particles but not an alkaline earth metal compound.

According to the present invention, the curable film-forming coating composition comprising aluminum or aluminum alloy particles and an alkaline earth metal compound applied to an aluminum substrate may improve blister size rating as visually rated according to TABLE 9 after 548 hours, 840 hours, 1,032 hours, or 3,000 hours of salt spray testing according to ASTM B-117 by a value of at least 6, such as a value of at least 5, such as a value of at least 4, such as a value of at least 3, such as a value of at least 2, such as a value of at least 1, when compared to a comparable coating composition that includes aluminum alloy particles but not an alkaline earth metal compound.

According to the present invention, the curable film-forming coating composition comprising aluminum or aluminum alloy particles and an alkaline earth metal compound applied to an aluminum substrate may improve blister frequency rating as visually rated according to TABLE 9 after 548 hours, 840 hours, 1,032 hours, or 3,000 hours of salt spray testing according to ASTM B-117 to a value of few or no blisters occurring.

According to the present invention, the curable film-forming coating composition comprising aluminum or aluminum alloy particles and an alkaline earth metal compound applied to a steel substrate may improve scribe appearance rating as visually rated according to TABLE 10 after 408 hours, 528 hours, 1,032 hours, or 912 to 1,104 hours of salt spray testing according to ASTM B-117 by a value of at least 3, such as a value of at least 2, such as a value of at least 1, when compared to a comparable coating composition that includes aluminum alloy particles but not an alkaline earth metal compound.

According to the present invention, the curable film-forming coating composition comprising aluminum or aluminum alloy particles and an alkaline earth metal compound applied to a steel substrate may improve scribe corrosion rating as visually rated according to TABLE 10 after 408 hours, 528 hours, 1,032 hours, or 912 to 1,104 hours of salt spray testing according to ASTM B-117 by a value of at least 2, such as a value of at least 1, when compared to a comparable coating composition that includes aluminum alloy particles but not an alkaline earth metal compound.

According to the present invention, the curable film-forming coating composition comprising aluminum or aluminum alloy particles and an alkaline earth metal compound applied to a steel substrate may improve face rusting rating as visually rated according to TABLE 10 after 548 hours, 840 hours, 1,032 hours, or 3,000 hours of salt spray testing according to ASTM B-117 by a value of at least 6, such as a value of at least 2, such as a value of at least 1, when compared to a comparable coating composition that includes aluminum alloy particles but not an alkaline earth metal compound.

According to the present invention, the curable film-forming coating composition comprising zinc or zinc alloy particles and an alkaline earth metal compound applied to a steel substrate may reduce the mean scribe creep as measured after 1,000 or 1,500 hours of salt spray testing according to ASTM B-117 by an amount of at least 10%, such as at least 20%, such as at least 30%, such as at least 40%, such as at least 48%, such as at least 50%, compared to a comparable coating composition that includes zinc or zinc alloy particles but not an alkaline earth metal compound.

According to the present invention, the curable film-forming coating compositions comprising zinc or zinc alloy particles and an alkaline earth metal compound may reduce scribe creep on steel substrates as measured according to SAE J2334 following exposure for 70 cycles by at least 45%, such as by at least 50%, such as by at least 57%, such as by at least 70%, such as by at least 80%, such as by at least 90%, when compared to a comparable coating composition that does not include an alkaline earth metal compound.

According to the present invention, the curable film-forming coating compositions comprising zinc or zinc alloy particles and an alkaline earth metal compound may reduce the presence of red rust on a steel or iron substrate along the length of a scribe after 1,000 hours of salt spray testing according to ASTM B-117 by an amount of at least 20%, such as at least 30%, such as at least 50%, such as at least 65%, such as at least 75%, such as at least 80%, such as at least 85%, such as at least 90%, such as at least 95%, such as 100%, when compared to a comparable coating composition that does not include an alkaline earth metal compound. The reduction in the presence of red rust along the length of the scribe was determined by determining the percentage of red rust in the scribe of the experimental coating and comparative coating, subtracting the percentage of red rust along the length of the scribe for the experimental coating from the percent of red rust along the length of the scribe for the comparative coating to determine the total reduction, dividing the total reduction by the percentage of red rust along the length of the scribe for the comparative coating and multiplying by 100. For example, if the experimental coating had 4% red rust along the length of the scribe and the comparative coating had 16% red rust along the length of the scribe, the reduction in the presence of red rust along the scribe would be 75%.

The coated substrate may comprise a steel or aluminum alloy substrate coated with a coating derived from the curable film-forming coating composition of the present invention, wherein the coating comprises, consists essentially of, or consists of an epoxy film-forming resin, a polyamine curing agent, aluminum alloy particles, and an alkaline earth metal compound comprising, consisting essentially of, or consisting of magnesium oxide, magnesium hydroxide, magnesium carbonate, magnesium monocarboxylate, magnesium sulfate, calcium oxide, calcium hydroxide, calcium carbonate, calcium monocarboxylate, calcium sulfate, barium oxide, barium hydroxide, barium carbonate, barium monocarboxylate, barium sulfate, or combinations thereof, and the aluminum particles may optionally be pretreated. The substrate may optionally be treated prior to coating such as by grit blasting the substrate surface, anodizing, and/or the substrate may be pretreated prior to coating, such as by a metal phosphate pretreatment composition, a zirconium pretreatment composition, a trivalent chromium pretreatment composition, a solgel pretreatment composition, or a rare earth metal pretreatment composition. The coated substrate may also optionally further comprise an additional coating layer, such as a primer, basecoat, or topcoat, wherein the additional coating layer comprises a polyurethane resin or an epoxy resin.

The coated substrate may comprise a steel or aluminum alloy substrate coated with a coating derived from the curable film-forming coating composition of the present invention, wherein the coating comprises, consists essentially of, or consists of an epoxy film-forming resin, a polyamine curing agent, aluminum alloy particles, and magnesium oxide, and the aluminum particles may optionally be pretreated. The substrate may optionally be treated prior to coating such as by grit blasting the substrate surface, anodizing, and/or the substrate may be pretreated prior to coating, such as by a metal phosphate pretreatment composition, a zirconium pretreatment composition, a trivalent chromium pretreatment composition, a solgel pretreatment composition, or a rare earth metal pretreatment composition. The coated substrate may also optionally further comprise an additional coating layer, such as a primer, basecoat, or topcoat, wherein the additional coating layer comprises a polyurethane resin or an epoxy resin.

The coated substrate may comprise a steel or aluminum alloy substrate coated with a coating derived from the curable film-forming coating composition of the present invention, wherein the coating comprises, consists essentially of, or consists of an epoxy film-forming resin, a polyamine curing agent, zinc particles, and an alkaline earth metal compound comprising, consisting essentially of, or consisting of magnesium oxide, magnesium hydroxide, magnesium carbonate, magnesium monocarboxylate, magnesium sulfate, calcium oxide, calcium hydroxide, calcium carbonate, calcium monocarboxylate, calcium sulfate, barium oxide, barium hydroxide, barium carbonate, barium monocarboxylate, barium sulfate, or combinations thereof, and the aluminum particles may optionally be pretreated. The substrate may optionally be treated prior to coating such as by grit blasting the substrate surface, anodizing, and/or the substrate may be pretreated prior to coating, such as by a metal phosphate pretreatment composition, a zirconium pretreatment composition, a trivalent chromium pretreatment composition, a solgel pretreatment composition, or a rare earth metal pretreatment composition. The coated substrate may also optionally further comprise an additional coating layer, such as a primer, basecoat, or topcoat, wherein the additional coating layer comprises a polyurethane resin or an epoxy resin.

The coated substrate may comprise a steel or aluminum alloy substrate coated with a coating derived from the curable film-forming coating composition of the present invention, wherein the coating comprises, consists essentially of, or consists of an epoxy film-forming resin, a polyamine curing agent, zinc particles, and magnesium oxide, and the aluminum particles may optionally be pretreated. The substrate may optionally be treated prior to coating such as by grit blasting the substrate surface, anodizing, and/or the substrate may be pretreated prior to coating, such as by a metal phosphate pretreatment composition, a zirconium pretreatment composition, a trivalent chromium pretreatment composition, a solgel pretreatment composition, or a rare earth metal pretreatment composition. The coated substrate may also optionally further comprise an additional coating layer, such as a primer, basecoat, or topcoat, wherein the additional coating layer comprises a polyurethane resin or an epoxy resin.

As used herein, unless otherwise defined herein, the term "substantially free" means the ingredient is present in an amount of 1% by weight or less, based on the total weight of the coating composition.

As used herein, unless otherwise defined herein, the term "essentially free" means the ingredient is present in an amount of 0.1% by weight or less, based on the total weight of the coating composition.

As used herein, unless otherwise defined herein, the term "completely free" means the ingredient is not present in the coating composition, i.e., 0.00% by weight, based on the total weight of the coating composition.

As used herein, the term "total solids" refers to the non-volatile content of the film-forming coating composition, i.e., materials which will not volatilize when heated to 110° C. for 15 minutes at standard atmospheric pressure, and specifically includes at least the metal particles, alkaline earth metal compound and organic binder.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Also, for molecular weights, whether number average ($M_n$) or weight average ($M_w$), these quantities are determined by gel permeation chromatography using polystyrene as standards as is well known to those skilled in the art and such as is discussed in U.S. Pat. No. 4,739,019, at column 4, lines 2-45.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" metal particle, "an" alkaline earth metal compound, and "an" organic binder, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "deposited onto" a substrate does not preclude the presence of one or more other intervening coating layers of the same or different composition located between the coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

ASPECTS

1. A curable film-forming coating composition comprising metal particles; an alkaline earth metal compound comprising an alkaline earth metal oxide, an alkaline earth metal carbonate, an alkaline earth metal hydroxide, an alkaline earth metal sulfate, an alkaline earth metal monocarboxylate, an alkaline earth metal phosphate, or combinations thereof; and an organic film-forming binder; wherein the weight ratio of metal particles to alkaline earth metal compound is no more than 55:1 when the alkaline earth metal compound comprises magnesium oxide.

2. The curable film-forming coating composition of Aspect 1, wherein the coating composition comprises:
   20% to 95% by weight metal particles, such as 25% to 95% by weight metal particles, such as 45% to 95% by weight metal particles, such as 55% to 95% by weight metal particles, such as 65% to 90% by weight metal particles, such as 70% to 85% by weight metal particles, such as 75% to 85% by weight metal particles, such as 20% to 75% by weight metal particles, such as 30% to 70% by weight metal particles, such as 40% to 60% by weight metal particles, based on the total solids weight of the coating composition; and
   0.5% to 50% by weight alkaline earth metal compound, such as 1% to 25% by weight alkaline earth metal compound, such as 2% to 20% by weight alkaline earth metal compound, such as 3% to 18% by weight alkaline earth metal compound, such as 5% to 18% by weight alkaline earth metal compound, based on the total solids weight of the coating composition.

3. The curable film-forming coating composition of Aspect 1 or 2, wherein the coating composition comprises 4.5% to 75% by weight of the organic film-forming binder, such as 5% to 50% by weight, such as 7% to 40% by weight, such as 20% to 40% by weight, such as 10% to 30% by weight, such as 11% to 25% by weight, based on the total solids weight of the coating composition.

4. The curable film-forming coating composition of any of the preceding Aspects, wherein the coating composition comprises:
   10% to 65% by volume metal particles, such as 24% to 60% by volume metal particles, such as 30% to 60% by volume metal particles, such as 30% to 55% by volume metal particles, such as 35% to 55% by volume metal particles, based on the total solids volume of the coating composition; and
   0.5% to 15% by volume alkaline earth metal compound, such as 2% to 11% by volume alkaline earth metal compound, such as 3% to 10% by volume alkaline earth metal compound, such as 3% to 9% by volume alkaline earth metal compound, based on the total solids volume of the coating composition.

5. The curable film-forming coating composition of any of the preceding Aspects, wherein the metal particles comprise, consist essentially of, or consist of zinc particles, aluminum particles, zinc alloy particles, aluminum alloy particles, or combinations thereof.

6. The curable film-forming coating composition of any of the preceding Aspects, wherein the alkaline earth metal compound comprises, consists essentially of, or consists of a compound of beryllium, magnesium, calcium, strontium, barium, or combinations thereof.

7. The curable film-forming coating composition of any of the preceding Aspects, wherein the alkaline earth metal compound comprises, consists essentially of, or consists of magnesium oxide, magnesium carbonate, magnesium hydroxide, magnesium sulfate, magnesium phosphate, calcium oxide, calcium carbonate, calcium hydroxide, calcium sulfate, calcium phosphate, strontium oxide, strontium carbonate, strontium hydroxide, strontium sulfate, strontium phosphate, barium oxide, barium carbonate, barium hydroxide, barium sulfate, barium phosphate, beryllium oxide, beryllium carbonate, beryllium hydroxide, beryllium sulfate, beryllium phosphate, or combinations thereof.

8. The curable film-forming coating composition of any of Aspects 1 to 7, wherein the alkaline earth metal compound comprises, consists essentially of, or consists of magnesium oxide.

9. The curable film-forming coating composition of any of the preceding Aspects, wherein a weight ratio of metal particles to alkaline earth metal compound of 1:1 to 200:1, such as 1.5:1 to 156:1, such as 1.7:1 to 75:1, such as 1.8:1 to 60:1, such as 2:1 to 55:1, such as 2.5:1 to 51.1.

10. The curable film-forming coating composition of any of Aspects 1 to 8, wherein the alkaline earth metal compound is magnesium oxide or magnesium carbonate, and magnesium oxide or magnesium carbonate are present in an amount such that the curable film-forming coating composition has a weight ratio of metal particles to magnesium oxide of 1:1 to 55:1, such as 1.5:1 to 51:1, such as 1.7:1 to 45:1, such as 1.8:1 to 40:1.

11. The curable film-forming coating composition of any of the preceding Aspects, wherein the organic film-forming binder comprises a film-forming resin.

12. The curable film-forming coating composition of Aspect 11, wherein the film-forming resin comprises, consists essentially of, or consists of polyurethane, polyester, polyamide, polyether, polysiloxane, fluoropolymer, polysulfide, polythioether, polyurea, (meth)acrylic resin, epoxy resin, vinyl resin, copolymers thereof, or mixtures thereof.

13. The curable film-forming coating composition of Aspects 11 to 12, wherein the organic film-forming binder further comprises a curing agent.

14. The curable film-forming coating composition of Aspect 13, wherein the curing agent comprises phenolic resin, amino resin, epoxy resin, beta-hydroxy (alkyl) amide resin, alkylated carbamate resin, (meth)acrylate, isocyanate, blocked isocyanate, polyacid, anhydride, organometallic acid-functional material, alkoxysilane, polyamine, polyamide, aminoplast, or combinations thereof.

15. The curable film-forming coating composition of any of the preceding Aspects, wherein the organic film-forming binder comprises 51% to 100% by weight of organic-based materials, such as 75% to 100% by weight, such as 85% to 100% by weight, such as 95% to 100% by weight, such as 99% to 100% by weight, such as 100% by weight, based on the total weight of the organic film-forming binder.

16. The curable film-forming coating composition of any of the preceding Aspects, further comprising a liquid medium.

17. The curable film-forming coating composition of Aspect 16, wherein the liquid medium comprises a non-aqueous medium.

18. The curable film-forming coating composition of Aspect 16 or 17, wherein the liquid medium comprises a solvent.

19. The curable film-forming coating composition of any of Aspects 1 to 15, wherein the coating composition is substantially free of a liquid medium, and the coating composition is in the form of a powder coating composition.

20. The curable film-forming coating composition of any of Aspects 1 to 15, wherein the coating composition is substantially free, essentially free, or completely free of a liquid medium, and the coating composition is in the form of a 100% solids composition.

21. The curable film-forming coating composition of any of the preceding Aspects, wherein the coating composition is in the form of a single component coating composition, wherein the metal particles, alkaline earth metal compound and organic binder are present in a single container.

22. The curable film-forming coating composition of any of Aspects 13 to 15, wherein the coating composition is in the form of a multi-component coating composition comprising a first component comprising the film-forming resin; and a second component comprising the curing agent; wherein the metal particles and/or alkaline earth metal compound are each independently present in the first component, the second component, an optional third component, or a combination thereof.

23. The curable film-forming coating composition of any of the preceding Aspects, wherein the coating composition cures under ambient conditions.

24. The curable film-forming coating composition of any of Aspects 1 to 22, wherein the coating composition cures by heating to a temperature of 200° C. or less, such as 121.1° C. to 200° C., such as 150° C. to 200° C.

25. The curable film-forming coating composition of any of Aspects 1 to 22, wherein the coating composition cures by heating to a temperature of 121.1° C. to 260.0° C.

26. The curable film-forming coating composition of any of the preceding Aspects, wherein the metal particles comprise zinc or zinc alloy particles.

27. The curable film-forming coating composition of Aspect 26, wherein the coating composition is substantially free, essentially free, or completely free of organic phosphorus compounds.

28. The curable film-forming coating composition of Aspect 26 or 27, wherein the coating composition is substantially free, essentially free, or completely free of an aldehyde and/or ketone component having at least one aromatic ring comprising a ketone and/or aldehyde group and at least one pendant group represented by —$OR^1$, wherein each $R^1$ is independently selected from hydrogen, an alkyl group, or an aryl group.

29. The curable film-forming coating composition of any of Aspects 1 to 25, wherein the metal particles comprise aluminum or aluminum alloy particles.

30. The curable film-forming coating composition of Aspect 29, further comprising an aldehyde and/or ketone component having at least one aromatic ring comprising a ketone and/or aldehyde group and at least one pendant group represented by —$OR^1$, wherein each $R^1$ is independently selected from hydrogen, an alkyl group, or an aryl group.

31. The curable film-forming coating composition of any of the preceding Aspects, wherein the coating composition is substantially free, essentially free, or completely free of zirconium-containing compounds.

32. The curable film-forming coating composition of any of the preceding Aspects, wherein the coating composition is substantially free, essentially free, or completely free of microspheres.

33. The curable film-forming coating composition of any of the preceding Aspects, wherein the coating composition is substantially free, essentially free, or completely free of chromium-containing compounds.

34. The curable film-forming coating composition of any of the preceding Aspects, wherein the coating composition is substantially free, essentially free, or completely free of magnesium metal particles.

35. The curable film-forming coating composition of any of the preceding Aspects, wherein the coating composition is substantially free, essentially free, or completely free of amino acid.

36. The curable film-forming coating composition of any of the preceding Aspects, wherein the coating composition is substantially free, essentially free, or completely free of inorganic binder.

37. The curable film-forming coating composition of any of the preceding Aspects, wherein the coating composition is substantially free, essentially free, or completely free of metal polycarboxylate compounds.

38. A curable film-forming coating composition comprising metal particles; an alkaline earth metal compound comprising an alkaline earth metal oxide, an alkaline earth metal carbonate, an alkaline earth metal hydroxide, an alkaline earth metal sulfate, an alkaline earth metal monocarboxylate, an alkaline earth metal phosphate, or combinations thereof; and an organic film-forming binder; wherein the coating composition cures under ambient conditions or by heating to a temperature of 200° C. or less.

39. A substrate coated at least in part with the curable film forming coating composition of any of the preceding Aspects.

40. A method of coating a substrate comprising applying the coating composition of any of Aspects 1 to 38 to at least a portion of the substrate.

41. A method of making a multi-component curable film-forming composition comprising the curable film-forming composition, the method comprising forming a first component by combining an organic film-forming resin and an alkaline earth metal compound; forming a second component by combining a curing agent and an aldehyde and/or ketone component having at least one aromatic ring comprising a ketone and/or aldehyde group and at least one pendant group represented by —OR$^1$, wherein each R$^1$ is independently selected from hydrogen, an alkyl group, or an aryl group; and combining metal particles with the first component, second component, an optional third component, or a combination thereof.

Illustrating the invention are the following examples, which, however, are not to be considered as limiting the invention to their details. Unless otherwise indicated, all parts and percentages in the following examples, as well as throughout the specification, are by weight.

EXAMPLES

Aluminum-Containing Curable Film-Forming Coating Compositions

In preparing the aluminum metal containing coating compositions, the following ingredients provided in TABLE 1 were used:

TABLE 1

Provides a Description of Materials Used in Preparation of The Examples

| Ingredient | Description | Supplier |
|---|---|---|
| Ancamide ® 260A | Polyamide curing agent | Evonik |
| Cardolite NC-513 | Epoxy reactive diluent | Cardolite |
| Cymel U-216-10LF | n-butylated urea resin | Allnex |
| Silbond Condensed | Ethyl Silicate | Silbond |
| Bentone ® SD-2 | Bentonite Clay | Elementis Specialties |
| Ti-Pure ® R-706-11 | Titanium Dioxide | DuPont |
| Suspeno 201-NBA | Rheology additive | Poly-Resin Inc |
| Epon ™ 828 | Bisphenol A/epichlorohydrin resin | Hexion |
| Epon ™ 1001-A-80 | Bisphenol A/epichlorohydrin resin | Hexion |
| Silquest ® A-187 | Epoxy-silane | Momentive |
| Untreated Aluminum Powder | MIL-DTL-24779A (95% aluminum, 5% zinc, 0.015% indium) aluminum alloy atomized to D50 7 μm spherical powder | Valimet, Inc |
| TCP treated Aluminum Powder | Aluminum powder treated with a trivalent-chromium solution (TCP) by Av-DEC ® (MPN: ARP-02) | Av-DEC ® |
| Magchem ® 200AD | MgO: 1.2-micron average particle size, 175 m$^2$/g surface area | Martin Marietta Magnesia Specialties |
| Maglite Y | MgO: <325 mesh particle size, 55 m$^2$/g surface area | The HallStar Company |
| Nano magnesium oxide | MgO: 20 nanometer average particle size, >65 m$^2$/g surface area | Nanostructured & Amorphous Materials Inc |
| Magchem ® 10-325 | MgO: 9-10-micron average particle size | Martin Marietta Magnesia Specialties |
| EkaSol1 (or Ekasol) | A mixture of VOC exempt solvents, primarily methyl acetate | TBF Environmental |
| Oxsol 100 | Parachlorobenzotrifluoride | Special Materials Company |
| Barium Carbonate | Barium Carbonate | Solvay & CPC |
| Calcium Carbonate | Calcium Carbonate | OMYA Inc |
| Magnesium Carbonate | Magnesium Carbonate | Sigma-Aldrich |
| Barium Sulfate | Barium Sulfate | Huntsman |

TABLE 1-continued

Provides a Description of Materials Used in Preparation of The Examples

| Ingredient | Description | Supplier |
|---|---|---|
| Calcium Sulfate | Calcium Sulfate | Saint-Gobain |
| Magnesium Sulfate | Magnesium Sulfate | Sigma-Aldrich |
| HEUCORIN RZ | zinc-5-nitroisophthalate | Heucotech Ltd |
| DISPERBYK-180 | High molecular weight wetting agent | BYK |
| Proglyde DMM | Glycol Diether | DOW Chemical |
| Zinc Citrate | Zinc Citrate | Alfa Aesar |
| Zinc Oxalate | Zinc Oxalate | American Elements |
| Magnesium Oxalate | Magnesium Oxalate | Alfa Aesar |
| NACORR 1552 | Zinc Dinonylnaphthalene Sulfonate | King Industries |
| Ridoline 298 | Alkaline Cleaner | Henkel |
| Deoxidizer 6/16 | Aluminum surface etching solution - Nitric Acid based | Henkel |
| EAC-8 | Acidic Brightener | PPG PRC-Desoto |
| PreKote | Surface treatment | Pantheon Chemical |
| Turco 6849 | Alkaline Cleaner | Henkel |
| Turco Smut-Go NC | Non-chromated deoxidizer and desmutter | Henkel |
| SurTec 650 | Trivalent Chrome pretreatment | SurTec |
| Milling media | Part #74582 minimum 85% $Al_2O_3$ (16 to 20 mesh) | Coors Tek |

For each of the examples provided in TABLE 2 below, the amounts provided for each material are by weight in terms of grams unless otherwise noted. Examples 2 and 3 demonstrate the preparation of aluminum metal-containing curable film-forming compositions according to the present invention. Examples 1 and 4 are comparative examples.

TABLE 2

Coating Examples

| Charge | Material | Comp. Ex. 1 g | Ex. 2 g | Ex. 3 g | Comp. Ex. 4 g | Ex. 5 g |
|---|---|---|---|---|---|---|
| | Component A | | | | | |
| 1 | Butyl Acetate | 1.08 | 1.08 | 1.08 | 1.08 | 1.08 |
| 2 | Epon ™ 828 | 32.22 | 32.22 | 32.22 | 32.22 | 32.22 |
| 3 | Epon ™ 1001-A-80 | 35.91 | 35.91 | 35.91 | 35.91 | 35.91 |
| 4 | Suspeno 201-NBA | 2.94 | 2.94 | 2.94 | 2.94 | 2.94 |
| 5 | Ti-Pure ® R-706-11 | 7.27 | 7.27 | 7.27 | 7.27 | 7.27 |
| 6 | Bentone SD-2 | 3.52 | 3.52 | 3.52 | 3.52 | 3.52 |
| 7 | Cardolite NC-513 | 6.17 | 6.17 | 6.17 | 6.17 | 6.17 |
| 8 | Cymel U-216-10LF | 1.98 | 1.98 | 1.98 | 1.98 | 1.98 |
| 9 | Silbond Condensed | 4.65 | 4.65 | 4.65 | 4.65 | 4.65 |
| 10 | t-butyl acetate | 51.43 | 51.43 | 51.43 | 51.43 | 51.43 |
| 11 | Magchem ® 200AD | 0 | 18.84 | 18.84 | 0 | 56.51 |
| 12 | Silquest A-187 | 3.08 | 3.08 | 3.08 | 3.08 | 3.08 |
| | Component A Total | 150.24 | 169.08 | 169.08 | 150.24 | 206.75 |
| | Component B | | | | | |
| 13 | Butyl acetate | 41.40 | 41.40 | 41.40 | 41.40 | 41.40 |
| 14 | Ancamide ® 260A | 31.38 | 31.38 | 31.38 | 31.38 | 31.38 |
| | Component B Total | 72.78 | 72.78 | 72.78 | 72.78 | 72.78 |
| 15 | Untreated Aluminum Powder | 361.98 | 143.64 | 287.29 | 422.12 | 422.12 |
| 16 | t-butyl acetate | 19.50 | 0 | 19.50 | 0 | 0 |
| 17 | Oxsol 100 | 0 | 0 | 0 | 63.43 | 110.08 |
| 18 | Proglyde DMM | 0 | 0 | 0 | 31.71 | 55.04 |
| | Total Blended Weight | 604.50 | 385.50 | 548.64 | 740.28 | 866.77 |

The coating compositions in Examples 1-5 were prepared as follows: For Component A of each example, Charges 1, 2 and 3 were weighed into a suitable container and mixed with a cowles blade until uniform. Charges 4, 5 and 6 were weighed separately and added to the above with agitation. The solution was mixed for approximately 30 minutes, until a Hegman gauge reading of at least 4 to 5 was reached. Charges 7, 8, 9, and 10 were weighed and then added to the container and thoroughly mixed. The above solution was transferred to a glass jar along with Charge 11 and milling media at approximately half the weight of the component materials. The jars were sealed with lids and then placed on a Lau Dispersing Unit with a dispersion time of 2 hours. After the dispersion process was completed, Charge 12 was added to the Component A mixture and thoroughly mixed. For Component B, Charges 13 and 14 were weighed into a suitable container and mixed with a cowles blade until uniform. Prior to coating application, the corresponding ratios of each total Component A and total Component B shown in TABLE 2 were blended together in glass jars, thoroughly mixed and Charge 15 was added. The jars were sealed with lids and then placed on a Lau Dispersing Unit with a dispersion time of 5 minutes. After mixing, Charges 16, 17 and 18 were added, and the solution was mixed thoroughly.

The coatings of Examples 1 and 2 were spray applied with an HVLP spray gun onto 2024T3 bare aluminum alloy substrate panels that were pretreated to meet specification MIL-DTL-5541F, Type II class 1A pretreatment. The pretreated panels were provided by the Materials Engineering Division of the Naval Air Warfare Center, Air Craft Division. The film thickness of the coatings Examples ranged between 1.56 to 1.88 mils.

The coatings of Examples 1 and 3 were spray applied with an HVLP spray gun onto zinc phosphate steel panels. The pretreated panels were purchased from ACT Test Panel Technologies, item #10502 (BONDERITE 952 zinc-phosphate pretreatment and PARCOLENE 60 chrome seal with de-ionized water rinse). The film thickness of the coatings Examples ranged between 1.77 and 3.47 mils.

The coatings of Examples 4 and 5 were spray applied with an HVLP spray gun onto 2024T3 bare aluminum alloy substrate panels. Prior to coating application, the panels were solvent wiped with MEK to remove oil and dye, followed by either cleaning and deoxidizing with Ridoline 298 and Deoxidizer 6/16 for 2 to 2.5 minutes, with a 1-minute tap water rinse after each bath, or abrading with a Scotch-Brite® scouring pad. The abraded panels were wetted with deionized water and sprayed with either EAC-8 or PreKote before abrasion in three directions. They were then rinsed with deionized water again and wiped clean with a cotton-based cloth. Panels for Examples 4 and 5 were treated the same day as primer application. The film thickness of the coatings Examples ranged between 1.58 and 2.29 mils.

A two-component master batch (Component A and Component B) for use in the following examples was prepared as follows:

TABLE 3

Master Batch for Component A

| Charge | Material Component A Master Batch | Example g | Scaled g |
|---|---|---|---|
| 1 | Butyl Acetate | 1.04 | 25.03 |
| 2 | Epon ™ 828 | 31.25 | 750.10 |
| 3 | Epon ™ 1001-A-80 | 34.84 | 836.10 |
| 4 | Suspeno 201-NBA | 2.85 | 68.36 |
| 5 | Ti-Pure ® R-706-11 | 7.05 | 169.32 |
| 6 | Bentone SD-2 | 3.41 | 81.92 |
| 7 | Cardolite NC-513 | 5.99 | 143.65 |
| 8 | Cymel U-216-10LF | 1.92 | 46.15 |
| 9 | Silbond Condensed | 4.51 | 108.19 |
| 10 | Ekasol | 13.75 | 330.00 |
| 11 | Total | 106.62 | 2558.83 |

Master batches of a two-component composition referred to as Components A and B were created for use as the base components for multiple examples. To prepare the Component A master batch from the components listed in TABLE 3, Charges 1, 2, and 3 were weighed into a suitable container and mixed with a cowles blade until uniform. Charges 4, 5, and 6 were weighed separately and added to the above with agitation. The solution was mixed for approximately 30 minutes until a Hegman gauge reading of at least 4 to 5 was reached. Charges 7, 8, 9, and 10 were weighed separately and then added to the container and thoroughly mixed. The fully combined Component A master batch used in these examples is referred to as Charge 11 below.

TABLE 4

Master Batch for Component B

| Charge | Material Component B Master Batch | Example g | Scaled g |
|---|---|---|---|
| 12 | Butyl Acetate | 40.16 | 481.90 |
| 13 | Ancamide 260A | 30.44 | 365.28 |
| 14 | Total | 70.60 | 847.18 |

To prepare the Component B master batch from the components listed in TABLE 4, Charges 12 and 13 were added to a suitable container and mixed. The total mixture for Component B master batch used in these examples is referred to as Charge 14 below.

Curable film-forming coating compositions were prepared using the master batch Components A and B and additional components added thereto as indicated in the tables that follow were prepared as follows:

TABLE 5

Coating Examples of Aluminum and Alkaline Earth Metal Carbonates

| Charge | Material | Comp. Ex. 6 g | Ex. 7 g | Ex. 8 g | Ex. 9 g | Ex. 10 g | Ex. 11 g | Ex. 12 g |
|---|---|---|---|---|---|---|---|---|
| | Component A | | | | | | | |
| 11 | Master Batch | 106.62 | 106.62 | 106.62 | 106.62 | 106.62 | 106.62 | 106.62 |
| 15 | Barium Carbonate | 0 | 18.28 | 0 | 0 | 54.83 | 0 | 0 |
| 16 | Calcium Carbonate | 0 | 0 | 18.28 | 0 | 0 | 54.83 | 0 |
| 17 | Magnesium Carbonate | 0 | 0 | 0 | 18.28 | 0 | 0 | 54.83 |
| 18 | Barium Sulfate | 0 | 0 | 0 | 0 | 0 | 0 | 0 |
| 19 | Calcium Sulfate | 0 | 0 | 0 | 0 | 0 | 0 | 0 |
| 20 | Magnesium Sulfate | 0 | 0 | 0 | 0 | 0 | 0 | 0 |

TABLE 5-continued

Coating Examples of Aluminum and Alkaline Earth Metal Carbonates

| Charge | Material | Comp. Ex. 6 g | Ex. 7 g | Ex. 8 g | Ex. 9 g | Ex. 10 g | Ex. 11 g | Ex. 12 g |
|---|---|---|---|---|---|---|---|---|
| 21 | Ekasol | 36.15 | 36.15 | 36.15 | 36.15 | 36.15 | 36.15 | 36.15 |
| 22 | Untreated Aluminum Powder | 139.35 | 139.35 | 139.35 | 139.35 | 139.35 | 139.35 | 139.35 |
| 23 | Ekasol | 0 | 0 | 0 | 0 | 0 | 0 | 12.32 |
| 24 | Silquest A-187 | 2.99 | 2.99 | 2.99 | 2.99 | 2.99 | 2.99 | 2.99 |
| | Component A Total | 285.10 | 303.38 | 303.38 | 303.38 | 339.93 | 339.93 | 352.25 |
| | Component B | | | | | | | |
| 14 | Master Batch Component B | 70.60 | 70.60 | 70.60 | 70.60 | 70.60 | 70.60 | 70.60 |
| | Component B Total | 70.60 | 70.60 | 70.60 | 70.60 | 70.60 | 70.60 | 70.60 |
| | Total Blended Weight | 355.70 | 374.00 | 374.00 | 374.00 | 410.50 | 410.50 | 422.80 |

TABLE 6

Coating Examples of Aluminum and Alkaline Earth Metal Sulfates

| Charge | Material | Comp. Ex. 13 g | Ex. 14 g | Ex. 15 g | Ex. 16 g | Ex. 17 g | Ex. 18 g | Ex. 19 g |
|---|---|---|---|---|---|---|---|---|
| | Component A | | | | | | | |
| 11 | Master Batch Component A | 106.62 | 106.62 | 106.62 | 106.62 | 106.62 | 106.62 | 106.62 |
| 15 | Barium Carbonate | 0 | 0 | 0 | 0 | 0 | 0 | 0 |
| 16 | Calcium Carbonate | 0 | 0 | 0 | 0 | 0 | 0 | 0 |
| 17 | Magnesium Carbonate | 0 | 0 | 0 | 0 | 0 | 0 | 0 |
| 18 | Barium Sulfate | 0 | 18.28 | 0 | 0 | 54.83 | 0 | 0 |
| 19 | Calcium Sulfate | 0 | 0 | 18.28 | 0 | 0 | 54.83 | 0 |
| 20 | Magnesium Sulfate | 0 | 0 | 0 | 18.28 | 0 | 0 | 54.83 |
| 21 | Ekasol | 36.15 | 36.15 | 36.15 | 36.15 | 36.15 | 36.15 | 36.15 |
| 22 | Untreated aluminum powder | 139.35 | 139.35 | 139.35 | 139.35 | 139.35 | 139.35 | 139.35 |
| 23 | Ekasol | 0 | 0 | 0 | 0 | 0 | 0 | 12.32 |
| 24 | Silquest A-187 | 2.99 | 2.99 | 2.99 | 2.99 | 2.99 | 2.99 | 2.99 |
| | Component A Total | 285.10 | 303.38 | 303.38 | 303.38 | 339.93 | 339.93 | 352.25 |
| | Component B | | | | | | | |
| 14 | Master Batch Component B | 70.60 | 70.60 | 70.60 | 70.60 | 70.60 | 70.60 | 70.60 |
| | Component B Total | 70.60 | 70.60 | 70.60 | 70.60 | 70.60 | 70.60 | 70.60 |
| | Total Blended Weight | 355.70 | 374.00 | 374.00 | 374.00 | 410.50 | 410.50 | 422.80 |

A set amount of Master Batch Component A, Charge 11, was transferred to a glass jar along with Charges 15, 16, 17, 18, 19, 20, 21, 22, 23 and milling media at approximately half the weight of the component materials. The jars were sealed with lids and then placed on a Lau Dispersing Unit with a dispersion time of 2 hours. After the pigment dispersion process was completed, Charge 24 was added to the Component A mixture and thoroughly mixed. Prior to coating application, the corresponding ratios of each total Component A and total Component B shown in TABLE 5 and TABLE 6 were blended together in glass jars and thoroughly mixed.

The coatings of Examples 6 through 12 were spray applied with an HVLP spray gun onto untreated cold rolled steel panels. The non-pretreatment panels were purchased from ACT Test Panel Technologies, item #QD-412, The panels were sanded and solvent wiped before primer application. The film thickness of the coatings Examples ranged between 1.49 and 2.12 mils.

The coatings of Examples 13 through 19 were spray applied with an HVLP spray gun onto 2024T3 bare aluminum alloy substrate panels pretreated to meet military specification MIL-DTL-5541F, Type II class 1A pretreatment. The aluminum panels were solvent wiped with MEK before pretreatment to remove oil, dirt, and dyes. The panels were immersed in a 20% solution of 140° F. Turco 6849 in deionized water for 5 minutes followed by two 110° F. tap water rinses for 2.5 minutes each. The panels were then immersed in a 20% solution of Turco Smut-Go NC in deionized water for 1 minute followed by two tap water rinses, >70° F. for 1 minute each. Then the panels were immersed in a 20% solution of SurTec 650 in deionized water for 4 minutes followed by two tap water rinses, >70° F. for 1 minute each. Panels were allowed to fully dry before being wrapped up and placed in a desiccator. After application of Examples 6 through 19, the dry film thickness of the coatings ranged between 1.59 to 2.02 mils.

The coatings of Examples 13 through 19 were also spray applied with an HVLP spray gun onto zinc phosphate pretreated steel panels and untreated cold rolled steel panels. The zinc phosphate pretreated steel panels were purchased from ACT Test Panel Technologies, item #10739 (BOND-ERITE 952 zinc-phosphate pretreatment and PARCOLENE 60 chrome seal with de-ionized water rinse). The film thickness of the coatings Examples ranged between 1.56 and 2.21 mils. The untreated cold rolled steel panels were also purchased from ACT Test Panel Technologies, item #56225, grit blasted cold rolled steel. The film thickness of the coatings Examples ranged between 3.56 and 4.29 mils.

Additional comparative curable film-forming coating compositions were prepared using the master batch Components A and B and additional components added thereto as indicated in the table that follows were prepared as follows:

TABLE 7

Comparative Examples of Aluminum and Other Additives

| Charge | Material | Comp. Ex. 20 g | Comp. Ex. 21 g | Comp. Ex. 22 g | Comp. Ex. 23 g | Comp. Ex. 24 g |
|---|---|---|---|---|---|---|
| | Component A | | | | | |
| 11 | Master Batch Component A | 106.62 | 106.62 | 106.62 | 106.62 | 106.62 |
| 15 | HEUCORIN RZ | 0 | 38.00 | 0 | 0 | 0 |
| 16 | Glycerin | 0 | 0 | 1.94 | 0 | 0 |
| 17 | Benzyl Alcohol | 0 | 0 | 15.34 | 0 | 0 |
| 18 | DISPERBYK-180 | 0 | 0 | 7.49 | 0 | 0 |
| 19 | Proglyde DMM | 0 | 0 | 57.41 | 0 | 0 |
| 20 | Zinc Citrate | 0 | 0 | 50.40 | 0 | 0 |
| 21 | Zinc Oxalate | 0 | 0 | 31.30 | 30.00 | 0 |
| 22 | Magnesium Oxalate | 0 | 0 | 0 | 30.00 | 0 |
| 23 | NACORR 1552 | 0 | 0 | 0 | 0 | 10.67 |
| 24 | Ekasol | 36.15 | 36.15 | 0 | 36.15 | 36.15 |
| 25 | Untreated Aluminum Powder | 139.35 | 139.35 | 139.35 | 139.35 | 139.35 |
| 26 | Silquest A-187 | 2.99 | 2.99 | 2.99 | 2.99 | 2.99 |
| | Component A Total | 285.10 | 323.10 | 412.84 | 345.10 | 295.77 |
| | Component B | | | | | |
| 14 | Master Batch Component B | 70.60 | 70.60 | 70.60 | 70.60 | 70.60 |
| | Component B Total | 70.60 | 70.60 | 70.60 | 70.60 | 70.60 |
| | Total Blended Weight | 355.70 | 393.70 | 483.44 | 415.70 | 366.37 |

A set amount of Master Batch Component A, Charge 11, was transferred to a glass jar along with the amount indicated in TABLE 7 of Charges 15, 21, 22, 23, 24, and 25 and milling media at approximately half the weight of the component materials. Example 22 had Charges 16, 17, 18, 19, 20, and 21 added to a jar and allowed to sit for 16 hours before Charge 11 was added. The jars were sealed with lids and then placed on a Lau Dispersing Unit with a dispersion time of 2 hours. After the pigment dispersion process was completed, Charge 26 was added to the Component A mixture and thoroughly mixed. Prior to coating application, the corresponding ratios of each total Component A and total Component B shown in TABLE 7 were blended together in glass jars and thoroughly mixed.

The comparative curable film-forming coating compositions of Examples 20 through 24 were spray applied with an HVLP spray gun onto zinc phosphate steel panels. The panels were purchased from ACT Test Panel Technologies, item #10739 (BONDERITE 952 zinc-phosphate pretreatment and PARCOLENE 60 chrome seal with de-ionized water rinse). The film thickness of the coatings Examples ranged between 1.24 and 3.04 mils.

Curable film-forming coating compositions were prepared using the master batch Components A and B and additional components added thereto as indicated in the tables that follow were prepared as follows:

TABLE 8

Coating Examples of Treated and Untreated Aluminum with MgO blend

| Charge | Material | Comp. Ex. 26 g | Ex. 27 g | Comp. Ex. 28 g | Ex. 29 g |
|---|---|---|---|---|---|
| | Component A | | | | |
| 11 | Master Batch Component A | 106.62 | 106.62 | 106.62 | 106.62 |
| 15 | Ekasol | 36.14 | 36.14 | 36.14 | 36.14 |
| 16 | Ekasol | 54.00 | 19.85 | 0 | 31.00 |
| 17 | Magchem ® 10-325 | 0 | 13.75 | 0 | 13.37 |
| 18 | Nano MgO | 0 | 13.75 | 0 | 13.75 |
| 19 | Maglite Y | 0 | 27.50 | 0 | 27.50 |
| 20 | TCP treated Aluminum Powder | 0 | 0 | 140.00 | 140.00 |
| 21 | Untreated Aluminum Powder | 296.82 | 140.00 | 0 | 0 |
| 22 | Silquest A-187 | 2.99 | 2.99 | 2.99 | 2.99 |
| | Component A Total | 496.57 | 360.60 | 285.75 | 371.75 |
| | Component B | | | | |
| 14 | Master Batch Component B | 70.60 | 70.60 | 70.60 | 70.60 |
| | Component B Total | 70.60 | 70.60 | 70.60 | 70.60 |
| 23 | Ekasol | 5.40 | 11.05 | 0 | 0 |
| | Total Blended Weight | 572.57 | 442.25 | 356.35 | 442.35 |

Charges 11 and 15 were pre-blended together and transferred to a glass jar along with Charges 16, 17, 18, 19, 20, 21 and milling media at approximately half the weight of the component materials. The jars were sealed with lids and then placed on a Lau Dispersing Unit with a dispersion time of 2 hours. After the pigment dispersion process was completed, Charge 22 was added to the Component A mixture and thoroughly mixed. Prior to coating application, the corresponding ratios of each total Component A and total Component B shown in TABLE 8 were blended together in glass jars and thoroughly mixed together and combined with charge 23.

The coatings of Examples 26 through 29 were spray applied with an HVLP spray gun onto 2024T3 bare aluminum alloy substrate panels were pretreated to meet military specification MIL-DTL-5541F, Type II class 1A by the process described above. The film thickness of the coatings Examples ranged between 1.21 to 1.88 mils.

The coatings of Examples 26 through 29 were spray applied with an HVLP spray gun onto zinc phosphate steel panels. The panels were purchased from ACT Test Panel Technologies, item #10739 (BONDERITE 952 zinc-phosphate pretreatment and PARCOLENE 60 chrome seal with de-ionized water rinse). The film thickness of the coatings Examples ranged between 1.14 and 1.53 mils.

The aluminum test panels coated with coating Examples 1, 2, 4, 5 and 13-29 were allowed to age under ambient conditions for a minimum of 7 days, after which the panels were inscribed with a 0.030" wide and 4" long by 4" long "X" that was engraved into the metal panel surface to a depth between 150 and 300 microns below the surface of the metal. A Gravograph IS 400 engraver with a 1 mm parallel carbide cutter was used to inscribe the coated aluminum test panels.

The steel test panels coated with coating Examples 1, 3, and 6-29 were allowed to age under ambient conditions for a minimum of 7 days, after which two intersecting lines were scribed diagonally across the coated surface of each panel, exposing the bare substrate. An Erichsen corrocutter model 639 fitted with a 15/532 scribing tool and 40 N weight was used to inscribe the coated steel test panels for Examples 1 and 3. A Fowler 52-500-050 Carbide Super Scriber, 6.5" Length was used to inscribe the coated steel test panels for Examples 6-29.

Scribed test panels of each coating example were then placed into a 5% sodium chloride neutral salt spray cabinet according to ASTM B117 (with the exception that pH & salt concentration was checked weekly as opposed to daily).

The corrosion results for aluminum and steel panels after exposure are tabulated in TABLES 11-16. The aluminum panels were visually rated according to the scale shown in TABLE 9 and steel panels were rated according to the scale shown in TABLE 10.

TABLE 9

Ratings and Descriptions for Aluminum Substrate Panels

|  |  |  | Scribe Blistering (Scribe Blist.) | |
|---|---|---|---|---|
| Scribe Appearance (Scribe App.) | Scribe Corrosion (Scribe Cor.) | | Size | Frequency (Freq.) |
| 0 Bright and Clean | 0 No lifting or loss of adhesion | | 0 = None | None = none |
| 1 Bright with very slight staining | 1 Lifting or loss of adhesion up to 0.5 mm | | 1 = V. Small | F = Few |
| 2 Lustrous with moderate staining | 2 Lifting or loss of adhesion up to 1.0 mm | | 2 = Small | M = Medium |
| 3 Loss of luster, no product build up | 3 Lifting or loss of adhesion up to 2.0 mm | | 3 = Small-Medium | MD = Medium Dense |
| 4 Heavy staining, minor corrosion no product build up | 4 Lifting or loss of adhesion up to 3.0 mm | | 4 = Med-Large | D = Dense |
| 5 Heavy staining, minor corrosion product build up | 5 Lifting or loss of adhesion up to 5.0 mm | | 5 = Large | |
| 6 Moderate corrosion product build up | 6 Lifting or loss of adhesion up to 7.0 mm | | | |
| 7 Major corrosion product build up | 7 Lifting or loss of adhesion up to 10.0 mm | | | |
| 8 Severe corrosion product build up | 8 Lifting or loss of adhesion up to 13.0 mm | | | |
| 9 Complete lifting of coating above rust around scribe | 9 Lifting or loss of adhesion up to 16.0 mm | | | |
| 10 Total consumption of coating around scribe | 10 Lifting or loss of adhesion up to >16.0 mm | | | |

TABLE 10

Ratings and descriptions for steel substrate panels

| Scribe Appearance (Scribe App.) | Scribe Corrosion (Scribe Cor.) | Face Rusting (Face Rust.) | |
|---|---|---|---|
| 0 Bright and Clean | 0 No lifting or loss of adhesion | 10 | 0.00% |
| 1 Bright with very slight staining | 1 Lifting or loss of adhesion up to 0.5 mm | 9 | 0.01% |
| 2 Lustrous with moderate staining | 2 Lifting or loss of adhesion up to 1.0 mm | 8 | >0.03% |
| 3 Loss of luster, no product build up | 3 Lifting or loss of adhesion up to 2.0 mm | 7 | >0.1% |
| 4 Heavy staining, minor corrosion no product build up | 4 Lifting or loss of adhesion up to 3.0 mm | 6 | >0.3% |
| 5 Heavy staining, minor corrosion product build up | 5 Lifting or loss of adhesion up to 5.0 mm | 5 | >1% |
| 6 Moderate corrosion product build up | 6 Lifting or loss of adhesion up to 7.0 mm | 4 | >3% |
| 7 Major corrosion product build up | 7 Lifting or loss of adhesion up to 10.0 mm | 3 | >10% |
| 8 Severe corrosion product build up | 8 Lifting or loss of adhesion up to 13.0 mm | 2 | >16% |
| 9 Complete lifting of coating above rust around scribe | 9 Lifting or loss of adhesion up to 16.0 mm | 1 | >33% |
| 10 Total consumption of coating around scribe | 10 Lifting or loss of adhesion up to >16.0 mm | 0 | >50% |

TABLE 11

1,032-hr Corrosion Test Results for Examples 1-3

| | | Substrate and Corrosion Performance | | | | | | |
|---|---|---|---|---|---|---|---|---|
| | | TCP treated 2024 aluminum | | | | B37 cold rolled steel | | |
| Ex. # | Description | Scribe App. | Scribe Cor. | Scribe Blist. - Size | Scribe Blist. - Freq. | Scribe App. | Scribe Cor. | Face Rust. |
| Comp 1 | Untreated Aluminum Only | 6 | 2 | 1 | F | 7 | 2 | 8 |
| 2 | Untreated Al + MgO | 1 | 0 | 0 | None | — | — | — |
| 3 | Untreated Al + MgO | — | — | — | — | 5 | 1 | 10 |

The corrosion data in TABLE 11 demonstrates that the curable film-forming coating compositions of Examples 2 and 3, each containing untreated aluminum powder and magnesium oxide, had measurably better corrosion resistance than that of Comparative Example 1 (containing untreated aluminum powder only) over aluminum and cold rolled steel substrates. Evidence of improved corrosion performance are demonstrated by the enhanced scribe appearance and reduced scribe corrosion, and a lack of blistering on the aluminum substrate and a lack of face rust on the cold rolled steel substrate.

TABLE 12

528-hr. Corrosion Test Results for Examples 4 and 5 (2024 aluminum)

| Ex. # | Pre-treatment Conditions | Description | Scribe App. | Scribe Cor. | Scribe Blist. - Size | Scribe Blist. - Freq. |
|---|---|---|---|---|---|---|
| Comp 4 | Clean/Deox | Untreated Aluminum Only | 3 | 1 | 1 | MD |
| | EAC-8 | | 3 | 1 | 1 | MD |
| | PreKote | | 3 | 1 | 1 | MD |
| 5 | Clean/Deox | Untreated Al + MgO | 1 | 1 | 1 | F |
| | EAC-8 | | 1 | 0 | 0 | None |
| | PreKote | | 1 | 0 | 0 | None |

The corrosion data in TABLE 12 demonstrates that the curable film-forming coating composition of Example 5 containing untreated aluminum powder and magnesium oxide had measurably better corrosion resistance than that of Comparative Example 4 (containing untreated aluminum powder only). The improvement is observed for each pretreatment condition with respect to a reduction or elimination of the scribe blister frequency, and with respect to scribe corrosion for the EAC-8 and PreKote pretreatment conditions.

TABLE 13

Corrosion Test Results for Examples 6-12

| | | Substrate and Corrosion Performance Sanded cold rolled steel, 528 hrs. | | |
|---|---|---|---|---|
| Ex. # | Description | Scribe App. | Scribe Cor. | Face Rust. |
| Comp 6 | Untreated Aluminum Only | 7 | 5 | 10 |
| 7 | Untreated Al + level 1 BaCO$_3$ | 7 | 4 | 10 |
| 8 | Untreated Al + level 1 CaCO$_3$ | 7 | 3 | 10 |
| 9 | Untreated Al + level 1 MgCO$_3$ | 7 | 4 | 10 |
| 10 | Untreated Al + level 2 BaCO$_3$ | 7 | 3 | 10 |
| 11 | Untreated Al + level 2 CaCO$_3$ | 7 | 2 | 10 |
| 12 | Untreated Al + level 2 MgCO$_3$ | 6 | 2 | 10 |

The corrosion data in TABLE 13 demonstrates that each of the curable film-forming coating compositions of Examples 7-12 that included untreated aluminum powder and an alkaline earth metal compound improved the scribe corrosion on the cold rolled steel substrate, with Example 12 also demonstrating improved scribe appearance, over comparative Example 6 that included only untreated aluminum powder.

TABLE 14

Corrosion Test Results for Examples 13-19

| | | Substrate and Corrosion Performance | | | | | | |
|---|---|---|---|---|---|---|---|---|
| | | TCP treated 2024 aluminum, 840 hrs. | | | | B952 cold rolled steel, 408 hrs. | | |
| Ex. # | Description | Scribe App. | Scribe Cor. | Scribe Blist. - Size | Scribe Blist. - Freq. | Scribe App. | Scribe Cor. | Face Rust. |
| Comp. 13 | Untreated Aluminum Only | 7 | 3 | 3 | M | 6 | 2 | 9 |
| 14 | Untreated Al + level 1 BaSO$_4$ | 7 | 1 | 1 | F | 4 | 1 | 10 |
| 15 | Untreated Al + level 1 CaSO$_4$ | 7 | 3 | 3 | F | 6 | 2 | 10 |
| 16 | Untreated Al + level 1 MgSO$_4$ | 7 | 1 | 1 | F | 5 | 2 | 10 |
| 17 | Untreated Al + level 2 BaSO$_4$ | 7 | 1 | 1 | F | 5 | 1 | 10 |
| 18 | Untreated Al + level 2 CaSO$_4$ | 7 | 3 | 3 | F | 5 | 2 | 10 |
| 19 | Untreated Al + level 2 MgSO$_4$ | 7 | 3 | 3 | F | 4 | 2 | 10 |

The corrosion data in TABLE 14 clearly shows that curable film-forming coating compositions of Examples 14, 16, and 17 containing untreated aluminum powder and either barium sulfate or magnesium sulfate had measurably better corrosion resistance than that of Comparative Example 13 (containing untreated aluminum powder only) over both substrates. Evidence of these improvements were enhanced scribe appearance, reduced scribe corrosion, and/or lessening of blistering. Curable film-forming coating compositions of Examples 15, 18, and 19 containing untreated aluminum powder and either calcium sulfate or magnesium sulfate had measurably better corrosion resistance than that of Comparative Example 13 over B952 cold rolled steel. Evidence of these improvements were the enhanced scribe appearance and reduced face rusting.

TABLE 15

Corrosion Test Results for Examples 20-24

| | | Substrate and Corrosion Performance B952 cold rolled steel, 408 hrs. | | |
|---|---|---|---|---|
| Ex. # | Description | Scribe App. | Scribe Cor. | Face Rust. |
| Comp 20 | Untreated Aluminum Only | 5 | 2 | 10 |
| Comp 21 | Untreated Al + HEUCORIN | 5 | 2 | 10 |
| Comp 22 | Untreated Al + ZnCit, ZnOx | 3 | 1 | 7 |
| Comp 23 | Untreated Al + MgOx, ZnOx | 5 | 3 | 9 |
| Comp 24 | Untreated Al + NACORR | 6 | 3 | 10 |

The corrosion data in TABLE 15 show that Comparative Example 21 containing untreated aluminum powder and HEUCORIN had no positive influence on corrosion resistance over cold rolled steel relative to Comparative Example 20 (containing untreated aluminum powder only). Comparative Example 22 containing untreated aluminum powder, zinc citrate, zinc oxalate, glycerin, and DISPERBYK-180 resulted in noticeable face rusting despite some improvement in scribe appearance and scribe corrosion relative to Comparative Example 20. Comparative Example 23 containing untreated aluminum powder, magnesium oxalate, and zinc oxalate produced worse scribe corrosion and face rusting over B952 cold rolled steel relative to Comparative Example 20. Comparative Example 24 containing untreated aluminum powder and NACORR produced worse scribe appearance and scribe corrosion than Comparative Example 20 over cold rolled steel.

TABLE 16

Corrosion Test Results for Examples 26-29

| | | Substrate and Corrosion Performance | | | | | | |
|---|---|---|---|---|---|---|---|---|
| | | TCP treated 2024 aluminum, 3000 hrs. | | | | B952 cold rolled steel, 912-1104 hrs. | | |
| Ex. # | Description | Scribe App. | Scribe Cor. | Scribe Blist. - Size | Scribe Blist. - Freq. | Scribe App. | Scribe Cor. | Face Rust. |
| Comp 26 | Untreated Aluminum Only | 8 | 4 | 3 | F | 8 | 5 | 10 |
| 27 | Untreated Al + MgO Blend | 6 | 2 | 1 | F | 5 | 4 | 10 |
| Comp 28 | TCP treated Aluminum Only | 6 | 4 | 3 | F | 6 | 6 | 10 |
| 29 | TCP treated Al + MgO Blend | 2 | 0 | 0 | None | 7 | 4 | 10 |

The corrosion data in TABLE 16 clearly shows that curable film-forming coating composition Example 27 containing untreated aluminum powder and a magnesium oxide blend had measurably better corrosion resistance over both substrates than Comparative Example 26 (containing untreated aluminum powder only). Curable film-forming coating composition Example 29 containing TCP treated aluminum powder and a magnesium oxide blend had measurably better corrosion resistance over both substrates than Comparative Example 28 (containing TCP treated aluminum powder only). Evidence of these improvements were the enhanced scribe appearance, reduced scribe corrosion, and/or lessening of blistering.

Zinc-Containing Curable Film-Forming Coating Compositions

Curable film-forming coating compositions were prepared using the Master Batch Components A and B (as described in TABLE 3 and TABLE 4 above) and additional components added thereto as indicated in TABLES 17A, 17B and 17C. The zinc powder used in Examples 30-45 was #2 Zinc Dust/330LL available from U.S. Zinc. The curable film-forming coating compositions were prepared as follows:

TABLE 17A

| Charge | Material | Comp. Ex. 30 Weight (g) | Ex. 31 Weight (g) | Ex. 32 Weight (g) | Ex. 33 Weight (g) | Ex. 34 Weight (g) | Ex. 35 Weight (g) | Ex. 36 Weight (g) |
|---|---|---|---|---|---|---|---|---|
| | Component A | | | | | | | |
| 11 | Component A Master Batch | 18.13 | 18.13 | 18.13 | 18.13 | 18.13 | 18.13 | 18.13 |
| 15 | Ti-Pure ® R-706-11 | 8.50 | 4.25 | 4.25 | 4.25 | 0 | 0 | 0 |
| 16 | Barium Carbonate | 0 | 4.25 | 0 | 0 | 8.50 | 0 | 0 |
| 17 | Calcium Carbonate | 0 | 0 | 4.25 | 0 | 0 | 8.50 | 0 |
| 18 | Magnesium Carbonate | 0 | 0 | 0 | 4.25 | 0 | 0 | 8.50 |
| 19 | Barium Sulfate | 0 | 0 | 0 | 0 | 0 | 0 | 0 |
| 20 | Calcium Sulfate | 0 | 0 | 0 | 0 | 0 | 0 | 0 |
| 21 | Magnesium Sulfate | 0 | 0 | 0 | 0 | 0 | 0 | 0 |
| 22 | Magchem ® 200 AD | 0 | 0 | 0 | 0 | 0 | 0 | 0 |
| 23 | Ekasol | 16.14 | 16.14 | 16.14 | 16.14 | 16.14 | 16.14 | 16.14 |
| 24 | Zinc powder | 153.00 | 153.00 | 153.00 | 153.00 | 153.00 | 153.00 | 153.00 |
| 25 | Silquest A-187 | 0.51 | 0.51 | 0.51 | 0.51 | 0.51 | 0.51 | 0.51 |
| | Component A Total | 186.28 | 186.28 | 186.28 | 186.28 | 186.28 | 186.28 | 186.28 |
| | Component B | | | | | | | |
| 14 | Component B Master Batch | 12.00 | 12.00 | 12.00 | 12.00 | 12.00 | 12.00 | 12.00 |
| | Component B Total | 12.00 | 12.00 | 12.00 | 12.00 | 12.00 | 12.00 | 12.00 |
| 26 | Ekasol | 0 | 0 | 0 | 3.00 | 0 | 0 | 12.00 |
| | Total Blended Weight | 198.28 | 198.28 | 198.28 | 201.28 | 198.28 | 198.28 | 210.28 |

TABLE 17B

| Charge | Material | Comp. Ex. 37 Weight (g) | Ex. 38 Weight (g) | Ex. 39 Weight (g) | Ex. 40 Weight (g) | Ex. 41 Weight (g) | Ex. 42 Weight (g) | Ex. 43 Weight (g) |
|---|---|---|---|---|---|---|---|---|
| | Component A | | | | | | | |
| 11 | Component A Master Batch | 18.13 | 18.13 | 18.13 | 18.13 | 18.13 | 18.13 | 18.13 |
| 15 | Ti-Pure ® R-706-11 | 8.50 | 4.25 | 4.25 | 4.25 | 0 | 0 | 0 |
| 16 | Barium Carbonate | 0 | 0 | 0 | 0 | 0 | 0 | 0 |
| 17 | Calcium Carbonate | 0 | 0 | 0 | 0 | 0 | 0 | 0 |
| 18 | Magnesium Carbonate | 0 | 0 | 0 | 0 | 0 | 0 | 0 |
| 19 | Barium Sulfate | 0 | 4.25 | 0 | 0 | 8.50 | 0 | 0 |
| 20 | Calcium Sulfate | 0 | 0 | 4.25 | 0 | 0 | 8.50 | 0 |
| 21 | Magnesium Sulfate | 0 | 0 | 0 | 4.25 | 0 | 0 | 8.50 |
| 22 | Magchem ® 200AD | 0 | 0 | 0 | 0 | 0 | 0 | 0 |
| 23 | Ekasol | 16.14 | 16.14 | 16.14 | 16.14 | 16.14 | 16.14 | 16.14 |
| 24 | Zinc powder | 153.00 | 153.00 | 153.00 | 153.00 | 153.00 | 153.00 | 153.00 |
| 25 | Silquest A-187 | 0.51 | 0.51 | 0.51 | 0.51 | 0.51 | 0.51 | 0.51 |
| | Component A Total | 186.28 | 186.28 | 186.28 | 186.28 | 186.28 | 186.28 | 186.28 |
| | Component B | | | | | | | |
| 14 | Component B Master Batch | 12.00 | 12.00 | 12.00 | 12.00 | 12.00 | 12.00 | 12.00 |
| | Component B Total | 12.00 | 12.00 | 12.00 | 12.00 | 12.00 | 12.00 | 12.00 |
| 26 | Ekasol | 0 | 0 | 0 | 0 | 0 | 0 | 0 |
| | Total Blended Weight | 198.28 | 198.28 | 198.28 | 198.28 | 198.28 | 198.28 | 198.28 |

TABLE 17C

| Charge | Material | Comp. Ex. 30 Weight (g) | Ex. 44 Weight (g) | Ex. 45 Weight (g) |
|---|---|---|---|---|
| | Component A | | | |
| 11 | Component A Master Batch | 18.13 | 18.13 | 18.13 |
| 15 | Ti-Pure ® R-706-11 | 8.50 | 4.25 | 0 |
| 16 | Barium Carbonate | 0 | 0 | 0 |
| 17 | Calcium Carbonate | 0 | 0 | 0 |
| 18 | Magnesium Carbonate | 0 | 0 | 0 |
| 19 | Barium Sulfate | 0 | 0 | 0 |
| 20 | Calcium Sulfate | 0 | 0 | 0 |
| 21 | Magnesium Sulfate | 0 | 0 | 0 |
| 22 | Magchem ® 200AD | 0 | 4.25 | 8.50 |
| 23 | Ekasol | 16.14 | 16.14 | 16.14 |
| 24 | Zinc powder | 153.00 | 153.00 | 153.00 |
| 25 | Silquest A-187 | 0.51 | 0.51 | 0.51 |
| | Component A Total | 186.28 | 186.28 | 186.28 |
| | Component B | | | |
| 14 | Component B Master Batch | 12.00 | 12.00 | 12.00 |
| | Component B Total | 12.00 | 12.00 | 12.00 |
| 26 | Ekasol | 0 | 3.00 | 6.00 |
| | Total Blended Weight | 198.28 | 201.28 | 204.28 |

The curable film-forming coating compositions were prepared as follows: For each example, a set amount of Master Batch Component A (Charge 11) was transferred to an 8 oz. glass jar along with corresponding Charges 15, 16, 17, 18, 19, 20, 21, 22, 23, and 24 according to the amounts indicated in TABLES 17A, 17B and 17C. Then, milling media at approximately half the weight of the component materials was added to the mixture. The jars were sealed with lids and placed on a Lau Dispersing Unit for a dispersion time of 2 hours. After the pigment dispersion process was complete, Charge 25 was added to the Component A mixture and thoroughly mixed. Prior to coating application, Charge 14 (the total Component B amount) was added to the fully mixed Component A. The jars were sealed with lids and the solution was mixed thoroughly. The paints were passed through 125-micron filters to remove the media. After a 15-minute induction time, Charge 26 was added to some paints to improve viscosity before the spray-out.

The coatings of Examples 30 through 45 were spray applied with an HVLP spray gun onto untreated, grit-blasted cold rolled steel panels. The panels were purchased from ACT Test Panel Technologies, item #56225. The film thickness of the coatings Examples ranged from 3.56 to 4.86 mils.

The steel test panels coated with Examples 30 through 45 were allowed to age under ambient conditions for a minimum of 7 days, after which two intersecting lines were scribed diagonally across the coated surface of each panel, exposing the bare substrate. The panels were scribed by hand according to ASTM D1654 and the scribe was 0.50 mm wide.

Scribed test panels of each coating example were then placed into a 5% sodium chloride neutral salt spray cabinet according to ASTM B117 (with the exception that the pH & salt concentration were checked weekly as opposed to daily).

When the panels were rated according to ASTM D1654, all ratings were either a 9 or 10 with rust creepage from the scribe not exceeding an average of 0.5 mm. A summary of the ratings for mean rust creepage from the scribe according to ASTM D1654 is provided in TABLE 18 below. In order to obtain better quantitative differentiation of corrosion performance between the various coating examples, the percentage of the scribe corroded with red rust was calculated. Photographs of panels were printed out and the amount of red rust in the scribe was measured in centimeters and then divided by the total length of scribe to obtain the percentage of the scribe corroded with red rust. These values are in TABLES 19, 20 and 21 for the carbonates, sulfates, and oxides respectively.

TABLE 18

Representative Mean Creepage from Scribe as outlined in ASTM D1654

| Millimeters | Rating |
|---|---|
| None | 10 |
| Over 0 to 0.5 | 9 |
| Over 0.5 to 1.0 | 8 |
| Over 1.0 to 2.0 | 7 |
| Over 2.0 to 3.0 | 6 |
| Over 3.0 to 5.0 | 5 |
| Over 5.0 to 7.0 | 4 |
| Over 7.0 to 10.0 | 3 |
| Over 10.0 to 13.0 | 2 |
| Over 13.0 to 16.0 | 1 |
| Over 16.0 to more | 0 |

TABLE 19

1,000 hours B117 Corrosion Test Results for Examples 30-36

| Example # | Description | Percent of Scribe Corroded with Red Rust |
|---|---|---|
| Comp 30 | Zinc only | 16% |
| 31 | Zinc + level 1 BaCO$_3$ | 12% |
| 32 | Zinc + level 1 CaCO$_3$ | 2% |
| 33 | Zinc + level 1 MgCO$_3$ | 0% |
| 34 | Zinc + level 2 BaCO$_3$ | 12% |
| 35 | Zinc + level 2 CaCO$_3$ | 0% |
| 36 | Zinc + level 2 MgCO$_3$ | 2% |

The corrosion data in TABLE 19 clearly shows that the curable film-forming coating compositions of Examples 31-36 which contain zinc powder and an alkaline earth metal carbonate outperform Comparative Example 30 which only contains zinc powder. Evidence for the improvements in corrosion performance is shown by the decreased percentage of red rust corrosion in the scribe when an alkaline earth metal carbonate is included. As shown above, the use of the alkaline metal carbonate reduced the presence of red rust by at least 25% for barium carbonate, and at least 87.5% for calcium carbonate and magnesium carbonate, relative to the zinc only comparative coating composition. It should be noted that regardless of the identity of the alkaline earth metal or the loading of the alkaline earth metal carbonate, the corrosion performance after 1,000 hours B117 improves when an alkaline earth metal carbonate is included in the zinc-rich curable film-forming coating composition.

TABLE 20

1,000 hours B117 Corrosion Test Results for Examples 37-43

| Example # | Description | Percent of Scribe Corroded with Red Rust |
|---|---|---|
| Comp 37 | Zinc only | 21% |
| 38 | Zinc + level 1 BaSO$_4$ | 0% |
| 39 | Zinc + level 1 CaSO$_4$ | 0% |
| 40 | Zinc + level 1 MgSO$_4$ | 0% |
| 41 | Zinc + level 2 BaSO$_4$ | 0% |
| 42 | Zinc + level 2 CaSO$_4$ | 0% |
| 43 | Zinc + level 2 MgSO$_4$ | 1% |

The corrosion data in TABLE 20 clearly shows that the curable film-forming coating compositions of Examples 38-43 which contain zinc powder and an alkaline earth metal sulfate outperform Comparative Example 37 which only contains zinc powder with respect to corrosion performance. Improvements in corrosion performance are evidenced by the substantial decrease in the percentage of the scribe corroded with red rust when an alkaline earth metal sulfate is included. Regardless of the identity of the alkaline earth metal or the loading of the alkaline earth metal sulfate, the corrosion performance of Examples 38-43 was better than the control (Example 37). As shown above, the use of the alkaline metal sulfate reduced the presence of red rust by at least 95% for each of the alkaline metal sulfates, and the presence of red rust was eliminated, i.e., 100% reduction, for all but the level 2 magnesium sulfate, relative to the zinc only comparative coating composition. It should be noted that Comparative Example 37 has the same composition as Comparative Example 30 and both served as controls in their respective experiments. Because the panel sets featured in TABLES 19 and 20 were put into test at different times, some variation between the corrosion performance ratings of the controls is to be expected.

TABLE 21

1,000 hours B117 Corrosion Test Results for Examples 30, 44 and 45

| Example # | Description | Percent of Scribe Corroded with Red Rust |
|---|---|---|
| Comp 30 | Zinc only | 16% |
| 44 | Zinc + level 1 MgO | 3% |
| 45 | Zinc + level 2 MgO | 0% |

The corrosion results from TABLE 21 clearly demonstrate that the curable film-forming compositions of Examples 44 and 45 which contain zinc powder and magnesium oxide improve the corrosion performance of the coating relative to Comparative Example 30 which only contains zinc powder. The improvement is evidenced by the decreased amount of red rust in the scribe. As shown above, the use of magnesium oxide reduced the presence of red rust by at least 81%, and the level 2 magnesium oxide of Example 45 eliminated the presence of red rust, i.e., 100% reduction, relative to the zinc only comparative coating composition. Comparative Example 30 is the same for TABLES 19 and 21 as the panel sets were sprayed and put into test at the same time and only one control was used for both sets.

Three-pack curable film-forming coating compositions were prepared from the components listed in TABLE 22. Pigments where high speed dispersed in the resin, solvent, and dispersant before the remainder of the ingredients were added. All three packs A, B, and C were mixed together with up to 10 vol % thinner (xylene) before spraying. Each composition included 84% by weight zinc dust, based on the total solids weight.

TABLE 22

| Component | Comparative Example 46 (grams) | Example 47 (grams) |
|---|---|---|
| A Pack | | |
| Epon 828 | 5.76 | 5.76 |
| Methyl Amyl Ketone | 1.42 | 1.42 |
| Anti-Terra-U 100[1] | 0.12 | 0.12 |
| Magchem ® 200AD | 0 | 1.51 |
| Min-U-Sil 30[2] | 5.62 | 4.10 |

TABLE 22-continued

| Component | Comparative Example 46 (grams) | Example 47 (grams) |
|---|---|---|
| Xylene | 1.62 | 1.60 |
| Silquest A1110[3] | 0.33 | 0.33 |
| Disparlon 6900-20X[4] | 0.32 | 0.32 |
| B Pack | | |
| xylene | 3.32 | 3.32 |
| Versamid 140[5] | 3.32 | 3.32 |
| C Pack | | |
| #2 Zinc Dust/330LL[6] | 78.19 | 78.20 |

[1]Wetting and dispersing additive available from BYK
[2]Crystalline silica available from US Silica
[3]Silane coupling agent, commercially available from Momentive
[4]Rheology modifier available from King Industries
[5]Polyamide resin available from BASF
[6]Zinc Dust available from U.S. Zinc Both of the coating compositions of Examples 46 and 47 were sprayed over separate hot rolled steel panels to a dry film thickness of 100-130 microns. Each panel was grit blasted to a SP5 cleaning standard and a 2-3 mil profile. The panels were allowed to cure for 1 week at room temperature and humidity.

The coated panels were X-scribed down to the metal substrate and then exposed to an ASTM B117-11 salt fog cabinet for 500 and 1,000 hours. One panel of each coating was removed from salt fog and was visually evaluated for red rust in the scribe. The distance of the scribe containing red rust was divided by the total distance of the X-scribe in order to get a % red rust. After the 1,000-hour exposure time, one panel of each coating was scraped using a straight edge razor blade to remove the coating around the scribe. The average rust creep (mean scribe creep) was measured using equation 1 and is listed in TABLE 23.

$$\text{Rust creep } M = (C-W)/2 \tag{1}$$

wherein C is the average rust creepage width measured along 7 points of the scribe and W is the original width of scribe.

TABLE 23

| Example # | 500 hours % Red Rust in Scribe | 1000 hours mean red rust scribe creep (mm) |
|---|---|---|
| Comparative Example 46 | 36.5% | 0.82 |
| Example 47 | 1.38% | 0.49 |

As shown in TABLE 23, Example 47 with magnesium oxide shows less red rust and rust creepage than Comparative Example 46 that does not include magnesium oxide.

Additional three-pack curable film-forming coating compositions were prepared from the components listed in TABLE 24. Each pack was mixed together with up to 10 vol % thinner (xylene) before spraying. Each composition included 69% by weight zinc dust, based on the total solids weight.

TABLE 24

| Component | Comparative Example 48 (grams) | Comparative Example 49 (grams) | Comparative Example 50 (grams) | Example 51 (grams) | Example 52 (grams) |
|---|---|---|---|---|---|
| Pack A | | | | | |
| Amercoat ®68 HS Base[1] | 100 | 100 | 100 | 100 | 100 |
| Min-U-Sil 30 | 0 | 0 | 29.63 | 27.00 | 32.99 |
| Calcium Oxide | 0 | 0 | 0 | 5.72 | 0 |
| Magnesium Stearate | 0 | 0 | 0 | 0 | 1.73 |
| L-histidine | 0 | 0 | 0.60 | 0.60 | 0.60 |
| Silquest A1110 | 0 | 0 | 1.21 | 1.21 | 1.21 |
| Pack B | | | | | |
| Amercoat ®68 HS Hardener[1] | 33.95 | 33.95 | 34.01 | 33.95 | 33.95 |
| Pack C | | | | | |
| #2 Zinc Dust/330LL | 442.92 | 191.99 | 252.01 | 268.84 | 268.84 |

[1]Three-component zinc rich epoxy coating composition commercially available from PPG Industries, Inc.

Each of the coating compositions of Examples 48-52 were sprayed over separate hot rolled steel panels to a dry film thickness of 80-115 microns. Each panel was grit blasted to a SP5 cleaning standard and a 2-3 mil profile. The panels were then subsequently sprayed the next day with Sigma-Cover®410 epoxy midcoat available from PPG Industries, Inc. at a dry film thickness of 110-125 microns. A final topcoat layer of SigmaDur®550 US also available from PPG Industries, Inc. was sprayed at a dry film thickness of 60-70 microns. All the panels were allowed to cure for 1 week at ambient temperature and humidity.

The coated panels were scribed with a dremel. The horizontal scribe was 50 mm long, 2 mm wide, 12.5 mm from each long edge, and 25 mm from the bottom. The panels were then exposed to an ASTM B117-11 salt fog cabinet for 1,500 hours. One panel of each coating was scraped using a straight edge razor blade to remove the coating around the scribe. The average rust creep was measured using equation 1 and is listed in TABLE 25.

TABLE 25

| Example # | 1,500 hours mean red rust scribe creep (mm) |
|---|---|
| Comparative Example 48 | 2.31 |
| Comparative Example 49 | 1.91 |
| Comparative Example 50 | 1.78 |
| Example 51 | 0.92 |
| Example 52 | 0.90 |

As shown in TABLE 25, Example 51 with calcium oxide and zinc dust and Example 52 with magnesium stearate and zinc dust show less rust creep than each of Comparative Examples 48, 49 and 50 that only include zinc dust.

Powder, Zinc-Containing Curable Film-Forming Compositions

Three curable film-forming powder coating compositions were prepared from the components listed in TABLE 26.

TABLE 26

| Component | Comp. Ex. 53 (gram) | Comp. Ex. 54 (gram) | Exp. Ex. 55 (gram) |
|---|---|---|---|
| Araldite 9013 [1] | 8.2 | 10.2 | 8.16 |
| EPON ™ 2004 [2] | 8.2 | 10.2 | 8.16 |
| #2 Zinc dust [3] | 79.8 | 75.0 | 75.0 |
| RESIFLOW PL-200A [4] | 0.3 | 0.3 | 0.20 |
| Uraflow B [5] | 0.1 | 0.1 | 0.1 |
| EPIKURE ™ P-202 [8] | 3.3 | 4.1 | 3.28 |
| Magchem ® 200AD | — | — | 5.0 |
| Aluminum Oxide [9] | 0.1 | 0.1 | 0.1 |

[1] An epoxy resin having epoxy functional groups, hydroxyl functional groups, and an equivalent weight of about 700 to 750, commercially available from NanYa Plastics.
[2] An epoxy resin having epoxy functional groups, hydroxyl functional groups, and an equivalent weight of about 875 to 975, commercially available from Hexion.
[3] A solid particulate zinc dust, commercially available from PURITY ZINC.
[4] Acrylic/silica flow and leveling control agent, commercially available from Estron Chemical.
[5] Benzoin, commercially available from Mitsubishi Chemical Corp.
[8] Phenolic hydroxyl terminated solid flaked curing agent containing an accelerator, commercially available from Hexion.
[9] Aluminum Oxide from CABOT CORPORATION Each of the components listed in TABLE 26 for Examples 53-55 were weighed in a container and mixed in a prism high speed mixer for 30 seconds at 3500 RPM to form a dry homogeneous mixture. The mixture was then melt-mixed in a Werner Pfleiderer 19 mm twin screw extruder with an aggressive screw configuration and a speed of 500 RPM. The first zone was set at 50° C., and the second, third, and fourth zones were set at 80° C. The feed rate was such that a torque of 50-60% was observed on the equipment. The mixtures were dropped onto a set of chill rolls to cool and re-solidify the mixtures into solid chips. The chips were milled in a Mikro ACM®-1 Air Classifying Mill to obtain a particle size of 5 to 100 microns with a majority of the particles being from 20 to 40 microns. The resulting coating compositions for each of Examples 53-55 were solid particulate powder coating compositions that were free flowing.

Each of the solid particulate powder coating compositions of Examples 53-55 were electrostatically sprayed onto high tensile strength automotive coil springs pre-heated to 375° F. to a thickness of 25 microns to 75 microns onto a pre-heated substrate at 375° F. A commercial topcoat, PCM90195 available from PPG Industries, Inc., was then applied over the still hot part at a thickness of 250 microns to 500 microns and baked for about 35 minutes at 375° F. For corrosion testing scribes were cut into sections of the springs with a 1 mm thick tip on a high speed dremel cutting tool down through topcoat and primer to expose metal at the substrate. Scribe lengths were 4-5 inches in length. The springs were exposed to 70 cycles of SAE J2334 cyclic corrosion testing. After exposure the scribe area was scraped with a knife to expose any areas of corrosion and measurements were taken along every inch of the scribe and the average recorded in mm. The results are included in TABLE 27 below.

TABLE 27

| | Comp. Ex. 53 (mm) | Comp. Ex. 54 (mm) | Exp. Ex. 55 (mm) |
|---|---|---|---|
| 70 Cycles SAE J2334 corrosion exposure, mm total scribe creep corrosion | 7 | 6 | 3 |

The results demonstrate improved corrosion resistance for the experimental coating composition of Example 55 over the comparative coating compositions of Examples 53 and 54. Specifically, the results show that replacing 5% of the zinc loading, on total weight, with magnesium oxide can be beneficial to corrosion performance The improved corrosion resistance is demonstrated by a reduced length of scribe creep corrosion of the coating of experimental Example 55 compared to Comparative Examples 53 and 54.

Four additional curable film-forming powder coating compositions were prepared from the components listed in TABLE 28.

TABLE 28

| Component | Comp. Ex. 56 (gram) | Comp. Ex. 57 (gram) | Ex. 58 (gram) | Ex. 59 (gram) |
|---|---|---|---|---|
| NPES 903 [1] | 55.32 | 23.95 | 17.66 | 27.07 |
| EPON ™ 2004 | 13.85 | 5.99 | 4.41 | 6.77 |
| #2 Zinc dust | 0.00 | 50.00 | 50.00 | 25.0 |
| REGAL 660 [2] | 0.50 | 0.50 | 0.50 | 0.50 |
| RESIFLOW PL-200A | 0.79 | 0.79 | 0.79 | 0.79 |
| Uraflow B | 0.50 | 0.50 | 0.50 | 0.5 |
| EPIKURE ™ P-202 | 18.74 | 8.08 | 5.98 | 9.17 |
| Imidazole [3] | 0.20 | 0.09 | 0.06 | 0.10 |
| Microdyne 75-TR [4] | 10.00 | 10.00 | 10.00 | 10.00 |
| Magchem ® 200AD | 0.0 | 0.00 | 10.00 | 15.00 |
| Nubriox SP [5] | 0.00 | 0.00 | 0.00 | 5.00 |
| Aluminum Oxide | 0.10 | 0.10 | 0.10 | 0.10 |

[1] Epoxy resin from NAN YA PLASTICS
[2] Carbon Black from Cabot Corporation
[3] 2-METHYL-1H-IMIDAZOLE from Cabot Corporation
[4] Micronized Rubber from Lehigh Technologies. LLC
[5] Zinc phosphate from Ferro Corp.

Each of the components listed in TABLE 28 for Examples 56-59 were weighed in a container and mixed in a prism high speed mixer for 30 seconds at 3500 RPM to form a dry homogeneous mixture. The mixture was then melt mixed in a Werner Pfleiderer 19 mm twin screw extruder with an aggressive screw configuration and a speed of 500 RPM. The first zone was set at 50° C., and the second, third, and fourth zones were set at 80° C. The feed rate was such that a torque of 50-60% was observed on the equipment. The mixtures were dropped onto a set of chill rolls to cool and re-solidify the mixtures into solid chips. The chips were milled in a Mikro ACM®-1 Air Classifying Mill to obtain a particle size of 5 to 100 microns with a majority of the particles being from 20 to 40 microns. The resulting coating compositions for each of Examples 56-59 were solid particulate powder coating compositions that were free flowing.

Each of the solid particulate powder coating compositions of Examples 56-59 were electrostatically sprayed on to ACT supplied zinc phosphate cold rolled steel pretreated panels (#26241) to a thickness of 25 microns to 100 microns and gelled 5 minutes at 375° F. A commercial topcoat, PCM90195 was then applied over the still hot part at a thickness of 150 microns to 250 microns and baked for 35 minutes at 375° F. Panels were scribed in the middle lengthwise with a carbine tipped scribe tool through the coating to expose metal substrate for 10 inches of the panel. The panels were exposed to 70 cycles of SAE J2334 cyclic corrosion testing. After exposure the scribe area was scraped with a knife to expose any areas of corrosion and measurements were taken every inch and the average recorded in mm as shown in TABLE 4. The results are included in TABLE 29 below.

TABLE 29

|  | Comp. Ex. 56 | Comp. Ex. 57 | Ex. 58 | Ex. 59 |
|---|---|---|---|---|
| 70 Cycles SAE J2334 corrosion exposure, mm total scribe creep corrosion | 6.8 | 3.4 | 1.0 | 0.3 |

In Examples 56-59, it is shown that adding 50% on total weight zinc particles, as in Comparative Example 57, does improve corrosion performance versus the comparative coating composition of Comparative Example 56 that does not include zinc particles. However, blending in 10% magnesium oxide in conjunction with zinc particles further improved corrosion performance relative to Comparative Example 57, as demonstrated in Example 58. The improvement in corrosion performance is demonstrated even at a lower zinc particle loading at 25% by total weight that was blended with 15% by weight magnesium oxide and 5% by weight zinc phosphate in Example 59.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A method of making a multi-component curable film-forming coating composition comprising:
    forming a first component by combining an organic film-forming resin and an alkaline earth metal compound comprising magnesium oxide and/or magnesium hydroxide;
    forming a second component by combining a curing agent and an aldehyde and/or ketone component having at least one aromatic ring comprising a ketone and/or aldehyde group and at least one pendant group represented by —$OR^1$, wherein each $R^1$ is independently selected from hydrogen, an alkyl group, or an aryl group; and
    combining metal particles with the first component, the second component, an optional third component, or a combination thereof;
    wherein the metal particles comprise aluminum particles, aluminum alloy particles, or combinations thereof.

2. The method of claim 1, wherein the metal particles further comprise zinc particles.

3. The method of claim 1, wherein the metal particles comprise aluminum particles, aluminum alloy particles, or combinations thereof in the form of flakes.

4. The method of claim 1, wherein the metal particles comprise aluminum particles, aluminum alloy particles, or combinations thereof in the form of powder, dust, and/or flakes.

5. The method of claim 1, wherein the metal particles comprise aluminum particles, aluminum alloy particles, or combinations thereof, surface treated with a trivalent chromium pretreatment composition.

* * * * *